United States Patent
Ronnebaum et al.

(10) Patent No.: US 12,237,653 B1
(45) Date of Patent: Feb. 25, 2025

(54) LIVE LINE HANDLING DEVICE

(71) Applicant: The Nemaha-Marshall Electric Cooperative Association, Inc., Axtell, KS (US)

(72) Inventors: Blake A. Ronnebaum, Baileyville, KS (US); Kathleen M. O'Brien, Seneca, KS (US)

(73) Assignee: THE NEMAHA-MARSHALL ELECTRIC COOPERATIVE ASSOCIATION, INC., Axtell, KS (US)

( * ) Notice: Subject to any disclaimer, the term of this patent is extended or adjusted under 35 U.S.C. 154(b) by 595 days.

(21) Appl. No.: 17/465,582

(22) Filed: Sep. 2, 2021

(51) Int. Cl.
*H02G 1/02* (2006.01)

(52) U.S. Cl.
CPC .................................... *H02G 1/02* (2013.01)

(58) Field of Classification Search
CPC ... B25G 3/00; B25G 3/12; B25G 3/18; B25G 3/20; B25G 3/24; B25G 3/38; B25B 13/48; B25B 13/481; B25B 13/5091; B25B 23/00; B25B 23/0028; B25B 23/16; B25B 7/12; H01R 11/12; H01R 11/14; H01R 11/15; H01R 31/127; H01R 43/26; H01H 85/0208; H02G 1/02; H02G 7/06; B25J 1/04
See application file for complete search history.

(56) References Cited

U.S. PATENT DOCUMENTS

| | | | |
|---|---|---|---|
| 137,065 A | | 3/1921 | Johnson |
| 2,299,838 A | | 10/1942 | Mays |
| 2,316,428 A | * | 4/1943 | Heinrich ................ H01R 11/15 |
| | | | 81/53.1 |
| 2,352,686 A | | 7/1944 | Broadbooks |
| 2,966,817 A | | 1/1961 | Wengen |
| 3,458,996 A | | 8/1969 | Mixon, Jr. et al. |
| 3,666,311 A | | 5/1972 | McMullin |
| 3,788,691 A | * | 1/1974 | McMullin ................ B25J 1/04 |
| | | | 294/174 |
| 3,984,798 A | | 10/1976 | Bussen |
| 4,242,930 A | | 1/1981 | Myers et al. |
| 4,911,039 A | | 3/1990 | Lubbock et al. |
| 5,742,220 A | * | 4/1998 | Scherer ............. H01H 85/0208 |
| | | | 337/171 |
| 6,283,519 B1 | | 9/2001 | Dutton et al. |
| 10,490,913 B2 | | 11/2019 | De France et al. |
| 2015/0270674 A1 | * | 9/2015 | Sook ......................... B25J 1/04 |
| | | | 29/748 |
| 2018/0115090 A1 | * | 4/2018 | Rahman ................... H02P 6/28 |

\* cited by examiner

*Primary Examiner* — Robert J Scruggs
(74) *Attorney, Agent, or Firm* — Thorpe North & Western, LLP; David W. Osborne

(57) ABSTRACT

Disclosed herein are devices and methods for moving a workpiece on a power line. A device can comprise a housing having a proximal end and a distal end. The proximal end can be operable to couple with a rod. The distal end can have first and second intersecting channels, wherein the first channel can provide access to an interior portion of the housing. The device can further comprise a hook retractably and rotatably coupled to the housing. The hook can be irretractable into the interior portion of the housing when the hook is aligned with the first channel, and the hook can be at least partially retractable into the interior portion of the housing when the hook is aligned with the second channel.

21 Claims, 30 Drawing Sheets

LIVE LINE HANDLING DEVICE

BACKGROUND

Live-line maintenance on a transmission line is the maintenance of electrical equipment that often operates at high voltage while the equipment is energized. These live-line maintenance techniques can be used in the electric power distribution industry to avoid the disruption and high economic costs of having to turn off power to customers to perform periodic maintenance on transmission lines and other equipment. Some methods of live-line working include using a hot stick, using insulating gloves, using a raised potential, or de-energizing the live electrical line. Because the voltage on the live lines can exceed as much as 765 kV, hot stick working can allow the linemen to carry out the work without infringing on the minimum clearance distances from live equipment and can reduce the risk of injury.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein:

FIG. 4l illustrates a top perspective view of the device in accordance with an example;

Figure 1:
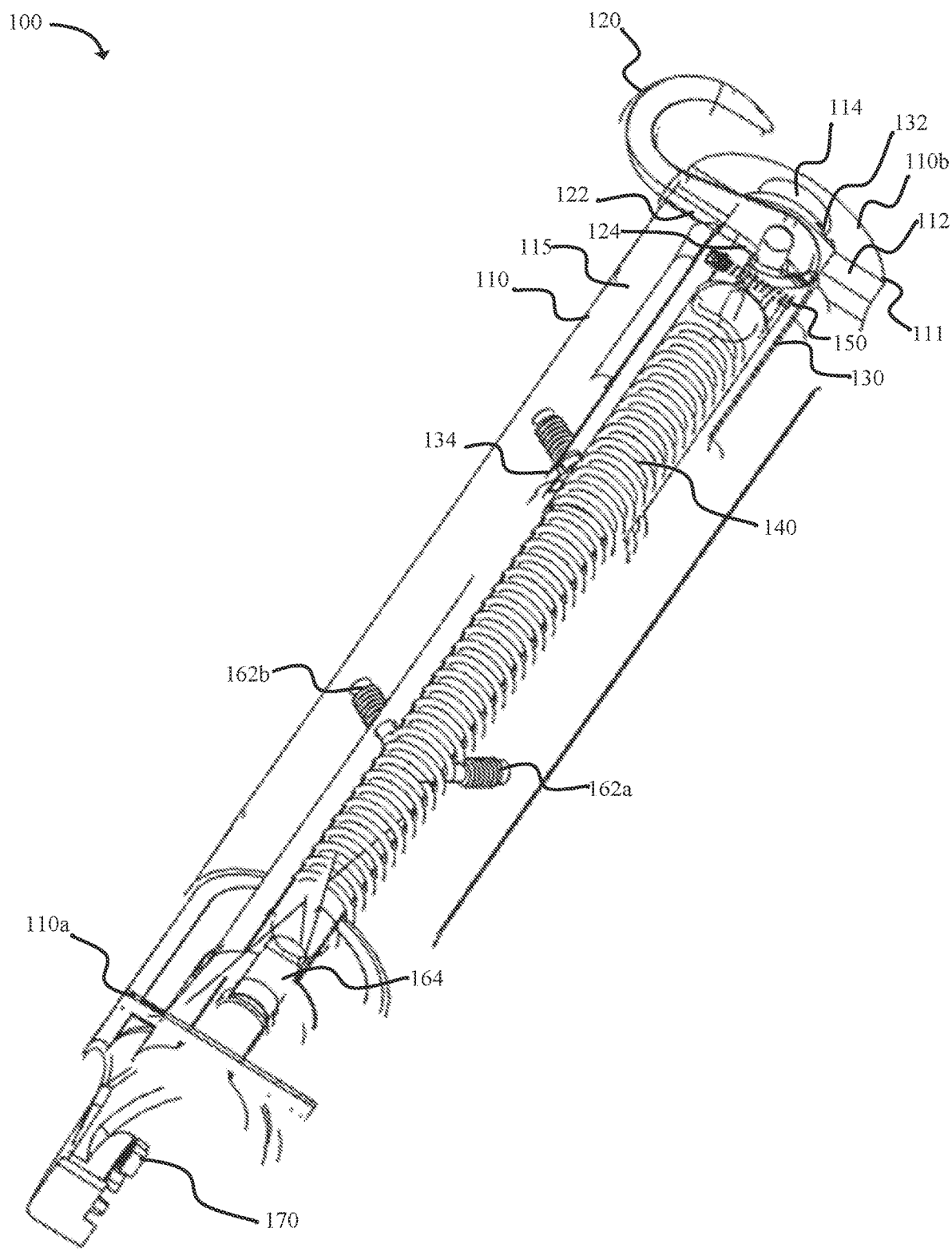
FIG. 1 illustrates a cross-sectional perspective view of a device in accordance with an example.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Definitions

As used in this written description, the singular forms "a," "an" and "the" include express support for plural referents unless the context clearly dictates otherwise.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present technology can be referred to herein along with alternatives for the various components thereof. It is understood that such embodiments, examples, and alternatives are not to be construed as de facto equivalents of one another but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the written description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The terms "coupled" and "connected" can be used interchangeably and refer to a relationship between items or structures that are either directly or indirectly connected in an electrical or nonelectrical manner. "Directly coupled" or "directly connected" objects or elements are in physical contact with one another. In this written description, recitation of "coupled" or "connected" provides express support for "directly coupled" or "directly connected" and vice versa. Objects described herein as being "adjacent to" each other may be in physical contact with each other, in close proximity to each other, or in the same general region or area as each other, as appropriate for the context in which the phrase is used.

Occurrences of the phrase "in one embodiment," or "in one aspect," herein do not necessarily all refer to the same embodiment or aspect.

Reference in the written description may be made to devices, structures, systems, or methods that provide "improved" performance. It is to be understood that unless otherwise stated, such "improvement" is a measure of a benefit obtained based on a comparison to devices, structures, systems, or methods in the prior art. Furthermore, it is to be understood that the degree of improved performance may vary between disclosed embodiments and that no equality or consistency in the amount, degree, or realization of improved performance is to be assumed as universally applicable.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein a "workpiece" refers to an object being physically engaged with a device in order to create a physical change. In one example, a change can be physical movement of the object from one location to another or from one orientation, position, or attitude to another. Structurally speaking, a "workpiece" can take a number of forms which can be engaged or otherwise purchased with a hook or hook-shaped portion of a device (e.g. fit partially or entirely within an open interior space of the hook). For example, an object with a cross-section diameter or measure that fits at least partially or entirely within an open interior space of the hook can include objects such as cables, wires, ropes, dowels, rings, other hooks, shafts or posts, nails, needles, bolts, screws, bars, pipes, etc.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Description

An initial overview of technology embodiments is provided below, and then specific technology embodiments are described in further detail later. This initial summary is intended to aid readers in understanding the technology more quickly but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Techniques for live-line working were first developed in the early 20th century. Live-line equipment and work methods have been refined to deal with increasingly high voltages (e.g., as high as 765 kV). The development of fiberglass poles and tools attached to such poles (e.g., wrenches, rotary wire brushes, and the like) allowed manipulation of live lines at a safe distance compared to direct handling of electrical wires.

However, finely tuned mechanical manipulation at a distance can be a challenge when using poles that exceed 10 feet, 20 feet, or even greater lengths. The Occupational Safety and Health Administration (OSHA) has stated that equipment be at least 10 feet away from power lines with voltages up to 50 kV, and for lines with voltages greater than 50 kV, the stated distance is even longer than 10 feet.

In some cases, using a pole and associated tool for manipulating a workpiece on a live transmission line can be a challenge for a skilled live-line worker. For example, a hot line tap clamp can have an eyelet that can be rotated to loosen or secure the clamp to a hot line. In some cases, the lengthy pole for manipulating the clamp on the high voltage line can be attached to a tool for loosening and securing the clamp.

However, tools that are easy to manipulate when in direct contact with the user can be increasingly difficult to manipulate as the length of the pole increases. When the tool attached to the end of the pole is a wrench, then rotating the eyelet on the hot line clamp can result in a lot of trial-and-error. For instance, to rotate the clamp sufficiently counter-clockwise to loosen the clamp, the user would: (i) position the wrench at the end of the pole at a distance that is often 10 feet or more away within a bounded volume of a few inches, and (ii) rotate the pole counterclockwise about 10-20 times when the eyelet is within this non-secure bounded volume. Securing the clamp to a hotline can be attempted by a similar operation in reverse.

Loosening and securing the hot line tap clamp are operations that are difficult to perform when using a pole attached to a wrench. A user may also desire to transfer the hot line tap clamp from one live line to another live line or to a transformer tap clamp. Without adequate securing of the hot line tap clamp to the tool used for manipulation and movement, the hot line tap clamp, which may be attached to a different live line when loosened from one live line, can be dislodged from the user's control and result in significant injury, death, and property damage.

In one embodiment, a device can comprise a housing having a proximal end and a distal end. In one aspect, the proximal end can be operable to couple with a rod, and the distal end can have first and second intersecting channels. In another aspect, the first channel can provide access to an interior portion of the housing. In one aspect, the device can further comprise a hook retractably and rotatably coupled to the housing. In one aspect, the hook may not be retractable into the interior portion of the housing when the hook is aligned with the first channel. In another aspect, the hook can be at least partially retractable into the interior portion of the housing when the hook is aligned with the second channel.

In another embodiment, a method is provided for moving a workpiece on a power line. In one aspect, the method can include securing the workpiece to a hook of a device in a non-retractable first channel orientation. In another aspect, the method can include rotating the hook to a retractable second channel orientation. In another aspect, the method can include retracting at least a portion of the hook into an inner portion of the housing of the device. In yet another aspect, the method can include rotating the device to remove the workpiece.

In yet another embodiment, a method is provided for transferring a power line clamp from one power line to different power line. In one aspect, the method can include securing a workpiece to a hook of in a first channel orientation. In another aspect, the method can include rotating the hook to a second channel orientation. In another aspect, the method can include engaging at least a portion of the hook in a second channel. In yet another aspect, the method can include rotating the hook when the at least the portion of the hook is engaged in the second channel to remove the workpiece.

Referring now to FIG. 1, there is shown an example of a device 100 that can include a housing 110 having a proximal end 110*a* and a distal end 110*b*. In one aspect, the proximal end 110*a* can be operable to couple with a rod (not shown) by coupling between the rod and a head 170.

In one aspect, the housing 110 can have any shape, design, or dimensions suitable to encase the components provided herein. In one example, the housing shape can be rectangular, cubical, triangular, octagonal, cylindrical, conical, elliptical, tubular, the like, or a combination thereof. In one specific example, the housing 110 can be shaped as a cylinder.

In another aspect, the housing 110 can comprise a material including one or more of: polymers (e.g. plastic), metal, fiberglass, composite materials, wood, the like, or a combination thereof. In one example, the housing can be fabricated from a non-conductive material to enhance the safety of the device 100. In one specific example, the housing can comprise ultra-high-molecular-weight (UHMW) polyethylene.

In one aspect, the head 170 can be operable to be coupled to the proximal end 110a of the housing 110 and can be operable to be coupled to the rod. Coupling a rod to the proximal end 110a of the housing 110 can provide a selected distance between a user handling the device and the workpiece. In one example, when a user is manipulating a workpiece on a cable (e.g., a power line), a rod length can provide the user with a recommended level of safety without reducing the user's ability to manipulate the device and the workpiece at a distance. In one example, the rod length can be 10 feet, or 20 feet, or 30 feet, or 40 feet, or 50 feet, a length greater than 10 feet but less than 20 feet, a length greater than 20 feet but less than 30 feet, a length greater than 30 feet but less than 40 feet, or a length greater than 40 feet but less than 50 feet.

In one aspect, coupling the head 170 to the proximal end 110a of the housing can allow a user to remove a workpiece from a cable (e.g., a power line) without setting up a truck and using cumbersome equipment to position a user in the air at a precise location. Previous devices were inoperable unless the user was positioned to within at least a 10-foot distance of the power line, which was accomplished by setting up a bucket truck and positioning the user close enough to the line to reach it.

In one aspect, the head can comprise a material including a metal material, such as steel, stainless steel, aluminum, titanium, etc. or rigid polymer materials or composite materials, such as fiberglass. In one specific example, the head can comprise cast aluminum.

In one aspect, the distal end 110b of the housing 110 can have first 112 and second 114 intersecting channels. In one example, the first channel 112 can provide access to an interior portion 115 of the housing 110. In one aspect, the first channel 112 can comprise a slot. In one example, the slot can be a substantially flat slot. In one example, the flat slot can be substantially flat when the variation between the lowest elevation portion of the valley of the slot and the highest elevation portion of the valley of the slot is less than a selected variation threshold in terms of distance. In this example, the variation threshold can be less than one or more of 5 mm, 4 mm, 3 mm, 2 mm, 1 mm, or a combination thereof. In another example, the threshold can be defined in terms of a percentage difference between the lowest elevation portion of the valley of the slot compared to the top of the slot and the highest elevation portion of the valley of the slot compared to the top of the slot. In this example, the percentage difference threshold can be less than one or more of 10%, 5%, 2%, 1%, or a combination thereof.

In one aspect, the first channel 112 can extend to an edge 111 of a periphery of the distal end 110b in a horizontal direction. A first channel 112 that extends to the edge 111 of the periphery of the distal end 110b can allow a portion 122 of the hook 120 to pivot into the first channel 110b and past the periphery 111 of the distal end 110b in a horizontal direction. In one example, the first channel 112 can extend to the edge of the periphery 111 in the horizontal direction of the distal end 110b on opposite horizontal ends of the distal end 110b. In this example, a portion 122 of the hook 120 can pivot into the first channel 112 at a 0° angle to the first channel 112 and at a 180° angle to the first channel 112.

In one aspect, the second channel 114 can be operable to allow at least a portion of the hook 120 to enter the interior portion 115 of the housing 110. In another aspect, the second channel 114 can comprise any shape suitable to allow at least partial retraction of the hook 120 into the interior portion 115 of the housing 110. In one example, the second channel 114 shape can be a rectangular prism, cubical, triangular prism, an octagonal prism, cylindrical, conical, ellipsoidal, the like, or a combination thereof. In another aspect, the second channel can comprise a concave shape. In one specific example, the second channel 114 can comprise an ellipsoid.

In another aspect, the shape of the second channel 114 and the shape of the hook 120 can be selected to allow at least partial retraction of the hook 120 into the interior portion 115 of the housing 110. In this example, when the second channel 114 is shaped as a rectangular prism, the hook 120 can comprise flat edges. In another example, when the second channel 114 is shaped as a concave shape, the hook 120 can comprise an arcuate shape.

In one aspect, the hook 120 can comprise any suitable material including, but not limited to, one or more of: aluminum, brass, titanium, steel, stainless steel, composite material (e.g., carbon fiber), the like, or a combination thereof.

In one aspect, the depth of the second channel 114 can extend into the interior portion 115 of the housing 110 to provide a retracting area for at least a portion of the hook 120. In one example, when the hook 120 is at least partially retracted into the interior portion 115 of the housing 110, the hook 120 can be securely engaged in a circumferential direction. In this example, the hook 120 can be prevented from rotating in a clockwise or counterclockwise direction by the second channel 114. This secure engagement can allow a user to rotate a device in a clockwise or counterclockwise direction to manipulate a workpiece.

In one aspect, the first channel 112 and the second channel 114 can intersect at an angle of from about 15 degrees to about 165 degrees. The angle of intersection between the first channel 112 and the second channel 114 can be selected to allow rotation of the device without excessive torsional force. In one specific example, the first channel 112 and the second channel 114 can intersect at an angle of about 90 degrees. In this example, a hook 120 can be engaged to a workpiece when oriented in the second channel 114. The hook 120 can at least partially retract into the interior portion 115 of the housing 110 to securely engage the workpiece in the first channel 112.

In another aspect, the first channel 112 can be operable to engage a workpiece. In one example, with the first channel 112 securely engaging the workpiece and the second channel 114 securely engaging at least a portion of the hook 120, the device 100 can be rotated in a clockwise or counterclockwise direction to attach or loosen the workpiece. Thus, an angle of intersection of about 90 degrees can allow rotation of the device without excessive torsional force because the amount of torsional force can be distributed uniformly among a first end of a first channel 112, an opposite end of a first channel 112, a first end of a second channel 114, and a second end of a second channel 114. Thus, in one aspect, the first channel 112 can be operable to withstand a torsional force from the workpiece.

In another example, an angle of intersection between the first channel 112 and the second channel 114 can be based on the specific direction of rotation (e.g., counterclockwise rotation or clockwise rotation). In one example, a device used for clockwise rotation (e.g., tightening workpieces rather than loosening workpieces) can have an angle of rotation between the first channel 112 and second channel 114 that reduces the amount of torsional force in the clockwise direction. In another example, a device used for counterclockwise rotation (e.g., loosening workpieces rather than tightening workpieces) can have an angle of rotation between the first channel 112 and second channel 114 that reduces the amount of torsional force in the counterclockwise direction. Thus, in one aspect, the second channel can be operable to withstand a torsional force from the hook.

In another aspect, the device 100 can include a hook 120 that can be retractably and rotatably coupled to the housing 110. In one aspect, the hook 120 can be irretractable into the interior portion 115 of the housing 110 when the hook 120 is aligned with the first channel 112. In another aspect, the hook 120 can be at least partially retractable into the interior portion 115 of the housing 110 when the hook 120 is aligned with the second channel 114. In another example, the hook 120 can be fully retractable into the interior portion 115 of the housing 110 (i.e., the topmost portion of the hook 120 can retract into the interior portion 115 of the housing 110) when the hook 120 is aligned with the second channel 114.

In another aspect, a portion 122 of the hook 120 can be operable to pivot out of the first channel 112. When the portion 122 of the hook 120 is in the first channel 112, the hook can be prevented from retracting into the interior portion 115 of the housing 120. The portion 122 of the hook 120 can pivot out of the first channel 112 until the portion 122 of the hook 120 is substantially perpendicular with respect to the first channel 112.

In another aspect, when the hook 120 is in a first channel orientation, the hook 120 can be operable to engage or disengage a workpiece. The hook 120 can be in a first channel orientation when the hook is in the first channel 112, a shown in FIG. 1. A hook 120 in this first-channel orientation can capture a workpiece when a user positions the hook 120 into contact with a workpiece to prevent the workpiece from being accidently dislodged. In one aspect, the hook can be operable to position a workpiece into contact with the distal end 110b of the housing 110.

In another aspect, the hook 120 can be operable to rotate between a first channel orientation and a second channel orientation. A hook 120 can be in a second channel orientation when the hook 120 is aligned with the second channel 114. A hook 120 that has engaged a workpiece in the second channel orientation can be operable to partially retract into the interior portion 115 of the housing 110. In one example, the portion of the hook that can retract into the interior portion 115 of the housing can be arcuate.

In another aspect, the hook 120 can be operable to extend out of the interior 115 or inner portion of the housing in a second channel orientation. In one example, the portion of the hook that can extend from the interior portion 115 of the housing can be arcuate.

In another aspect, the device 100 can comprise a hook compression member 150 operable to engage the hook 120. In one aspect, the hook compression member 150 can be operable to engage the hook 120 at a bottom portion 124 of the hook 120. In another aspect, the hook compression member 150 can be coupled to the hook 120. In one aspect, the hook compression member 150 can be a compression spring, a torsion spring, an extension spring, a spring steel insert, the like, or a combination thereof. In one specific example, the hook compression member can be a compression spring. In one example, the hook compression member 150 can comprise zinc plated music wire steel. In another aspect, the hook compression member 150 can comprise one or more of steel, stainless steel, zinc plated music wire steel, the like, or a combination thereof.

In one aspect, the hook compression member 150 can be operable to position a portion 122 of the hook 120 in a non-intersecting portion of the first channel 112. In this example, the hook compression member 150 can contact a bottom portion 124 of the hook 120 to pivot the hook 120 from a vertical position in which a portion 122 of the hook 120 is not positioned in the first channel 112 to a horizontal position in which the portion 122 of the hook 120 is positioned in the first channel. When the hook compression member 150 is in a relaxed state, the portion 122 of the hook 120 can be positioned in the first channel 112. When the hook compression member 150 is in a stressed state, the portion 122 of the hook 120 can be positioned out of the first channel 112.

In one aspect, the hook compression member 150 can be operable to support a load of from about 1 pound to about 5 pounds. In one example, the hook compression member 150 can be operable to support a load of about 1 pound, of about 2 pounds, of about 3 pounds, or about 4, pounds, or about 5 pounds. In one specific example, the hook compression member 150 can be operable to support a load of about 3.2 pounds.

In one aspect, the hook compression member 150 can have a length of from about 0.20 inches to about 0.75 inches in a relaxed state. In one example, the hook compression member 150 can have a length of about 0.20 inches, of about 0.25 inches, of about 0.30 inches, of about 0.35 inches, of about 0.40 inches, of about 0.45 inches, of about 0.50 inches, of about 0.55 inches, of about 0.60 inches, of about 0.65 inches, of about 0.70 inches, or of about 0.75 inches in a relaxed state. In one specific example, the hook compression member 150 can have a length that can range from about 0.24 inches in a compressed state to about 0.75 inches in a relaxed state.

In one aspect, the hook compression member 150 can have a spring rate of from about 1 pounds per inch to about 12 pounds per inch. In one example, the hook compression member 150 can have a spring rate of about 1 pound per inch, of about 2 pounds per inch, of about 3 pounds per inch, of about 4 pounds per inch, of about 5 pounds per inch, of about 6 pounds per inch, of about 7 pounds per inch, of about 8 pounds per inch, of about 9 pounds per inch, of about 10 pounds per inch, of about 11 pounds per inch, or of about 12 pounds per inch. In one specific example, the hook compression member 150 can have a spring rate of about 6.1 pounds per inch.

In another aspect, the device 100 can include a shuttle 130 coupled to the hook 120. In one aspect, the shuttle 130 can have a longitudinal guide 132 operable to guide movement of the shuttle 130 into the interior portion 115 of the housing 110. In one example, the longitudinal guide 132 can be a longitudinal track. In another aspect, the shuttle 130 can have a circumferential guide 134 operable to guide rotation of the shuttle 130 relative to a vertical plane of the housing 110. In one example, the circumferential guide 134 can be a circumferential track. In another aspect, the shuttle 130 can be operable to switch between a circumferential guide 134 for rotation to a longitudinal guide 132 for retraction or extension.

In one aspect, a shuttle can be a body or mass capable of moving back and forth between first and second positions. In some embodiments, a shuttle can include a mass or body (e.g. an elongated body) with first and second opposing ends that are operable to couple the shuttle to other components of a workpiece capture and manipulation device, such as the devices mentioned herein. In one aspect, the shuttle can comprise aluminum, steel, stainless steel, titanium, brass, polymer materials, composite materials, the like, or a combination thereof.

In another aspect, the shuttle 130 can be coupled to a shuttle tensioning member 140. In another aspect, a shuttle tensioning member 140 can be operable to retract the shuttle 130 and at least a portion of the hook 120 into the interior portion 115 of the housing 110. In another aspect, the shuttle tensioning member 140 can be operable to extend the shuttle 130 and at least a portion of the hook 120 out of the interior portion 115 of the housing 110. In one aspect, the spring tensioning member 140 can be operable to be coupled to a pin 164. The pin 164 can allow the main spring to rotate in a clockwise or counterclockwise direction without obstruction. In one aspect, the shuttle tensioning member 140 can be an extension spring, a compression spring, an elastic fiber, or a combination thereof. In one specific example, the spring tensioning member 140 can be an extension spring. In another example, the spring tensioning member 140 can comprise one or more of music wire steel, steel, stainless steel, the like, or a combination thereof.

In another aspect, the shuttle tensioning member 140 can be operable to support a load of from about 15 pounds to about 25 pounds. In one example, the shuttle tensioning member 140 can be operable to support a load of about 15 pounds, of about 16 pounds, of about 17 pounds, or of about 18, pounds, or of about 19 pounds, or of about 20 pounds, or of about 21 pounds, or of about 22 pounds, or of about 23 pounds, or of about 24 pounds, or of about 25 pounds. In one specific example, the shuttle tensioning member 140 can be operable to support a load of about 19.8 pounds.

In another aspect, the shuttle tensioning member 140 can have a length of from about 4 inches to about 8.4 inches in a relaxed state. In one example, the shuttle tensioning member 140 can have a length of about 4.0 inches, of about 4.4 inches, of about 4.8 inches, of about 5.2 inches, of about 5.6 inches, of about 6.0 inches, of about 6.4 inches, of about 6.8 inches, of about 7.2 inches, of about 7.6 inches, of about 8.2 inches, or of about 8.4 inches in a relaxed state. In one specific example, the shuttle tensioning member 140 can have a length that can range from about 4 inches in a relaxed state to about 8.4 inches in an extended state.

In another aspect, the shuttle tensioning member 140 can have a spring rate of from about 1 pound per inch to about 12 pounds per inch. In one example, the shuttle tensioning member 140 can have a spring rate of about 1 pound per inch, of about 2 pounds per inch, of about 3 pounds per inch, of about 4 pounds per inch, of about 5 pounds per inch, of about 6 pounds per inch, of about 7 pounds per inch, of about 8 pounds per inch, of about 9 pounds per inch, of about 10 pounds per inch, of about 11 pounds per inch, or of about 12 pounds per inch. In one specific example, the shuttle tensioning member 140 can have a spring rate of about 4.1 pounds per inch.

In another aspect, the device 100 can comprise protrusions 162a, 162b operable to stop retraction of the hook 120 into the housing 110. In one example, the protrusions can comprise at least one of pins, screws, bolts, dowels (e.g., wooden dowels), the like, or a combination thereof.

In another aspect, the housing 110 can be operable to encase at least a portion of the hook 120 and the shuttle 130. In one aspect, the housing can comprise indicators (not shown) operable to provide alignment between the housing 110 and a shuttle 130.

Figure 2A:
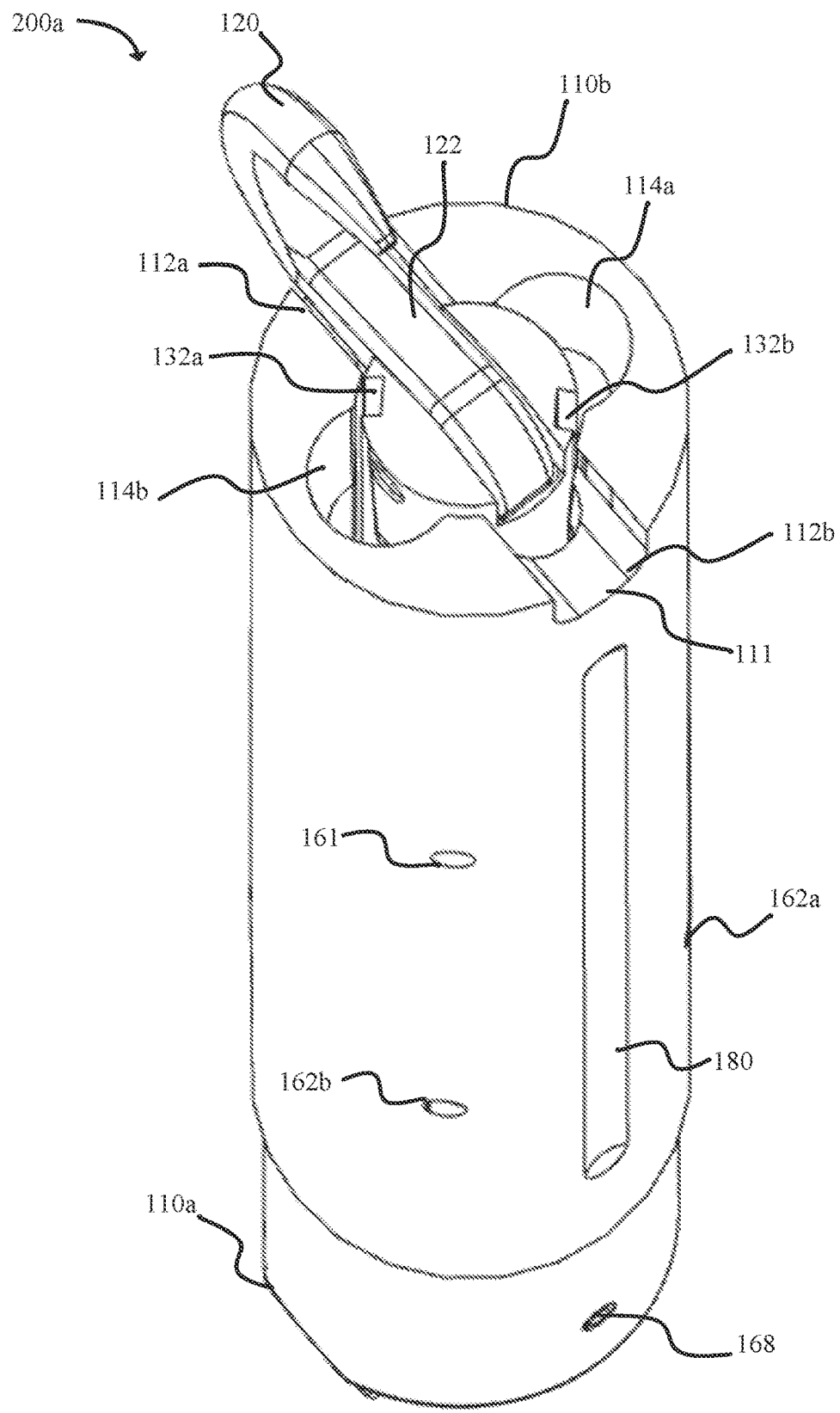
FIG. 2a illustrates a perspective view of a device with the housing and shuttle shown in accordance with an example.

In one example, as illustrated in the perspective in FIG. 2a with the housing encasing the device 200a, the device 200a can comprise a proximal end of the housing 110a and a distal end of the housing 110b. Protrusions (e.g., 162a and 162b) can be operable to stop retraction of the hook 120 into the interior portion of the housing. A pin 168 can be operable to secure a head to the proximal end of the housing 110a. Protrusions (e.g., 161) can be operable to contact a horizontal guide of the shuttle 130 or a vertical guide (e.g., 132a and 132b) of the shuttle 130. A portion 122 of a hook 120 can be positioned in a first end 112a of the first channel or a second end 112b of the first channel. The first channel can extend to a periphery 112b of the distal end 110b. The second channel can comprise a first end 114a and a second end 114b. When the hook is pivoted out of the first channel (e.g., 112a and 112b) and rotated from a first channel orientation (e.g., aligned with 112a and 112b) to a second channel orientation (e.g., aligned with 114a and 114b), the hook can be operable to at least partially retract into the interior portion of the housing. The indicator 180 can provide a visual indication of alignment between the hook and the first channel orientation or the second channel orientation.

Figure 2B:
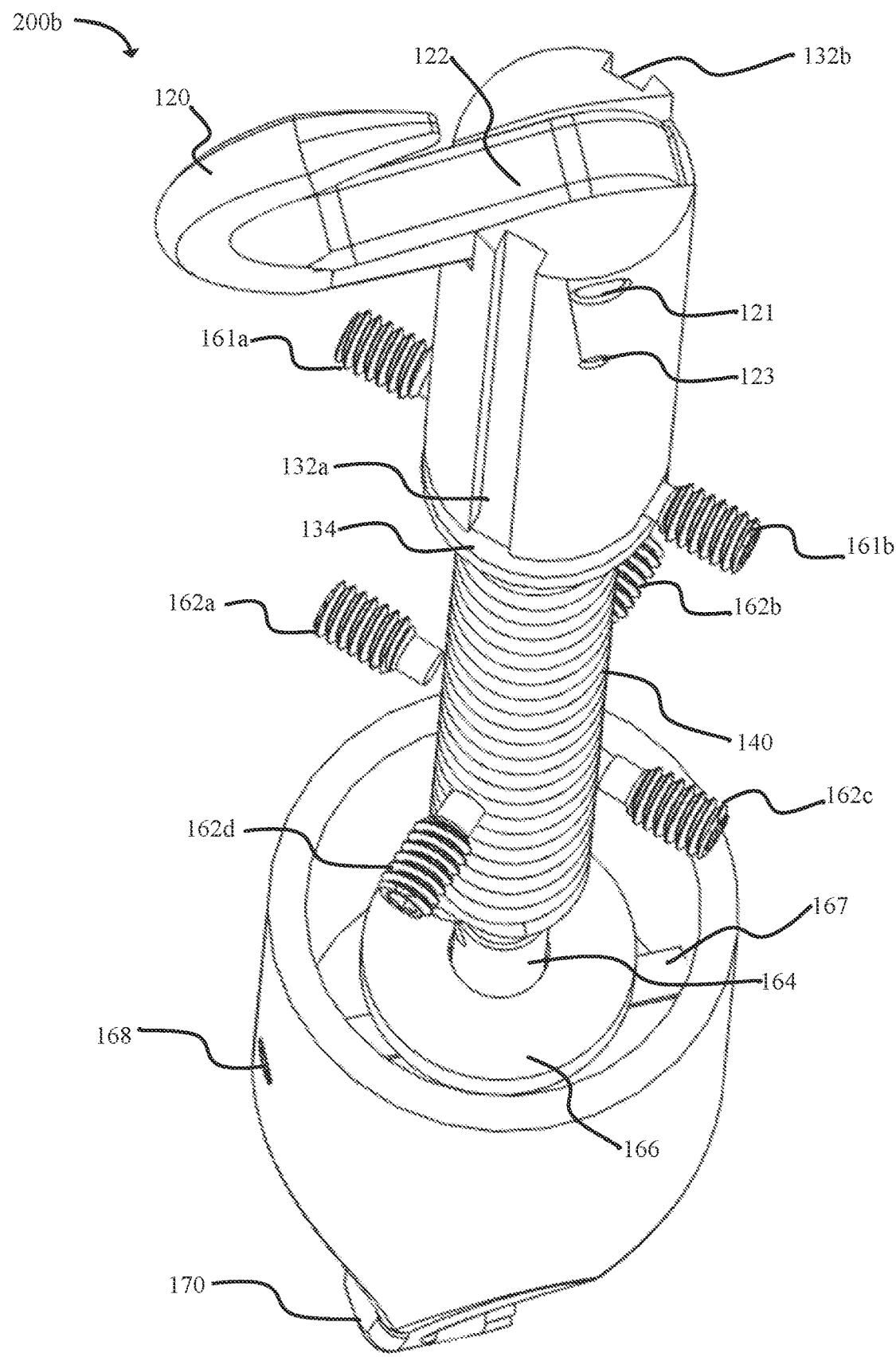
FIG. 2b illustrates a perspective view of a device with the housing not shown in accordance with an example.

In another example, as illustrated in the perspective view of FIG. 2b with the housing removed, the device 200b can comprise: (a) the hook 120, (b) a portion 122 of the hook 120 operable to pivot into a first channel and out of a first channel, (c) protrusions 161a, 161b operable to contact a horizontal guide 134 of the shuttle 130 or a vertical guide (e.g., 132a and 132b) of the shuttle 130, (d) protrusions 162a, 162b, 162c, 162d operable to prevent retraction of the hook into the interior portion of the housing beyond a selected distance, (e) a pin 121 operable to secure the hook 120 to the shuttle 130, (f) a pin 123 operable to secure the hook 120 and shuttle 130 combination to the housing, (g) a shuttle tensioning member 140 operable to retract or extend at least a portion of the hook 120 into or out of the interior portion of the housing, (h) a pin 164 operable to couple the shuttle tensioning member 140, (i) a washer 164 coupled between the pin 164 and the shuttle tensioning member 140, and (j) a pin 167 operable to secure the head 170 to the proximal end of the housing by insertion into the aperture 168.

Figure 2C:
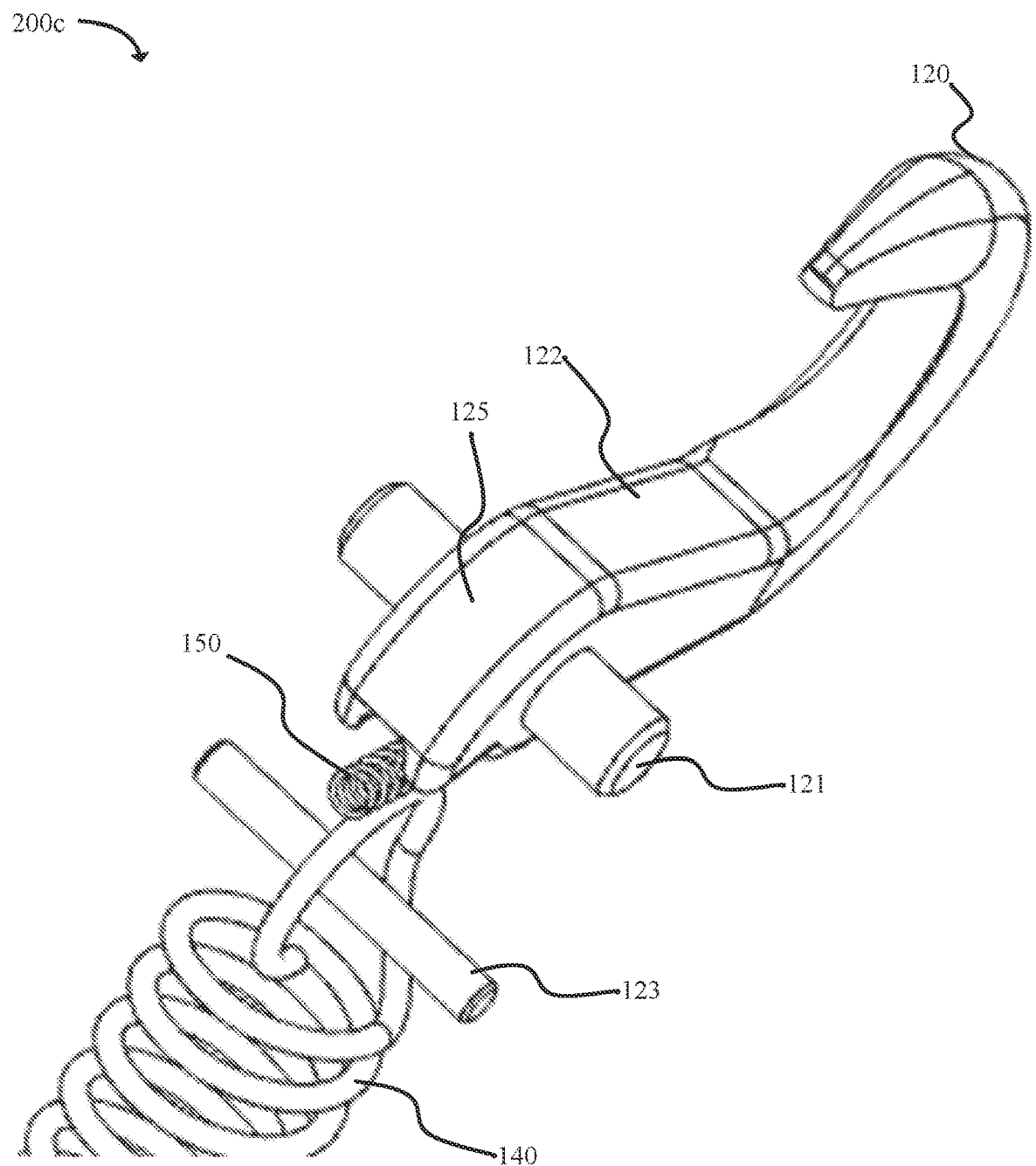
FIG. 2c illustrates a perspective view of a device with the housing and shuttle not shown in accordance with an example.

In one example, as illustrated in the perspective view of FIG. 2c with the housing and shuttle removed, the device 200c can comprise: (i) a hook 120 having a portion 122 operable to pivot into a first channel, (ii) a pivoting portion 125 operable to rotate the hook to and from a horizontal position and a vertical position, (iii) a pin 121 operable to couple the hook to the shuttle tensioning member 140, (iv) a pin 123 operable to couple the spring to the housing, and (v) a hook compression member 150 operable to position the hook in a horizontal position in the first channel.

Figure 3A:
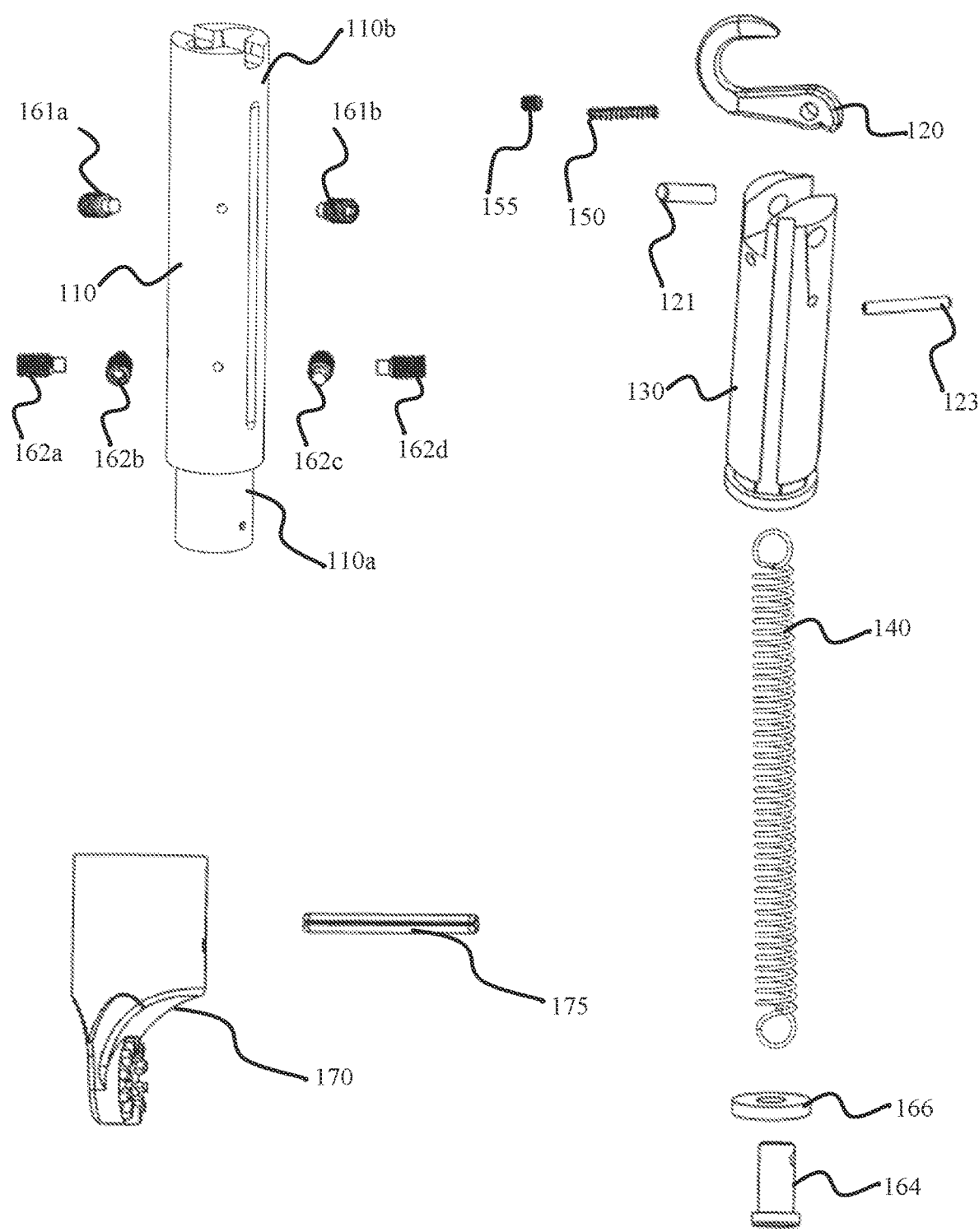
FIG. 3a illustrates components of the device in accordance with an example.

In one example, as illustrated in FIGS. 3a to 3i, a device 100 can be assembled in accordance with an example. As shown in FIG. 3a, various components can be provided including: (1) a housing 110 having a proximal end 110b and a distal end 110b, (2) protrusions 161a and 161b, (3) protrusions 162a, 162b, 162c, and 162d, (4) a hook 120, (5) a hook compression member 150, (6) a screw 155, (7) a pin 121, (8) a pin 123, (9) a shuttle 130, (10) a shuttle tensioning member 140, (11) a washer 166, (12) a pin 164, (13) a head 170, and (14) a pin 175.

Figure 3B:
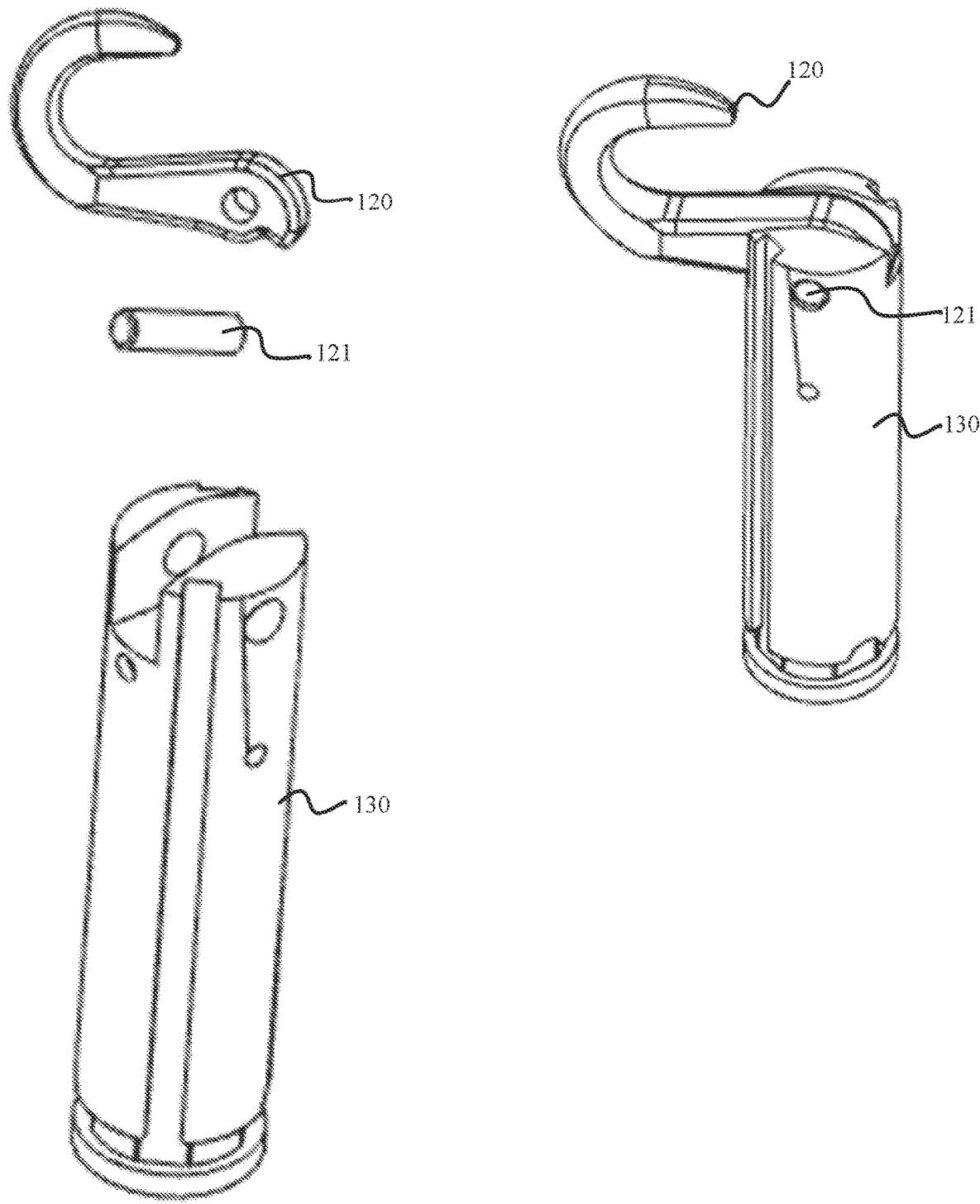
FIG. 3b illustrates a hook and shuttle of the device before and after coupling in accordance with an example.
Figure 3C:
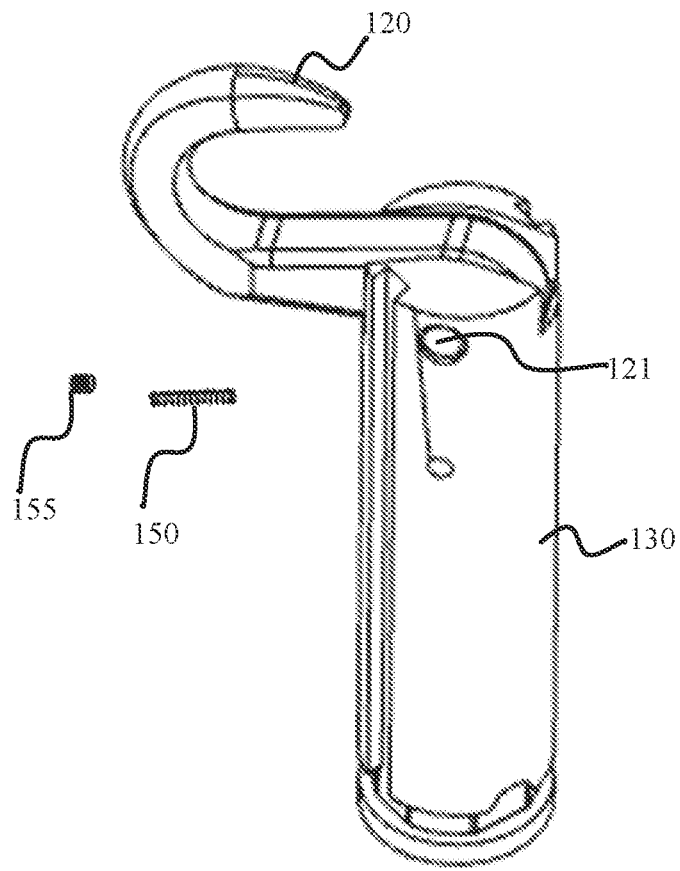
FIG. 3c illustrates a coupled hook and shuttle before engagement with a hook spring and set screw in accordance with an example.
Figure 3D:
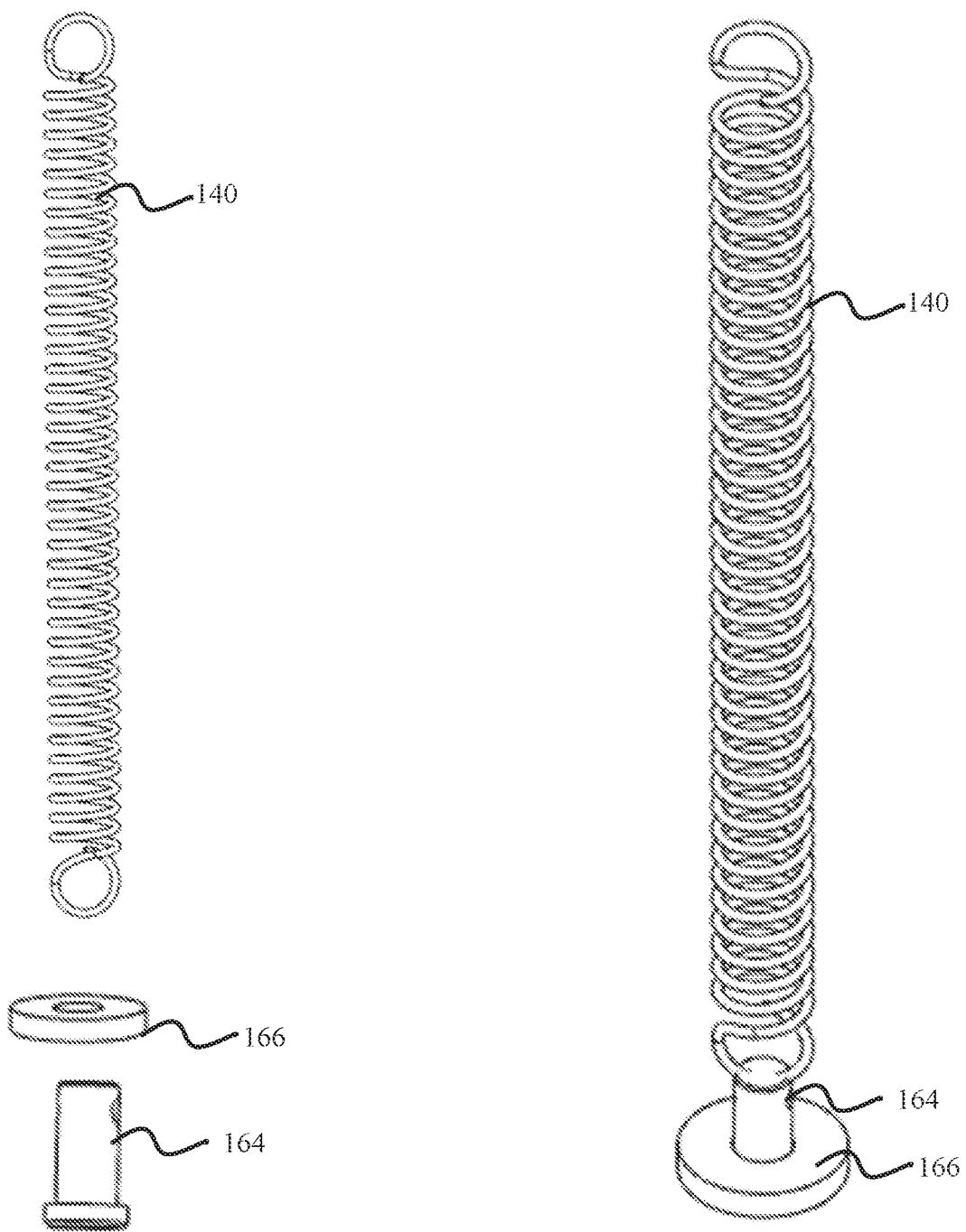
FIG. 3d illustrates a shuttle spring and pin before and after assembly in accordance with an example.
Figure 3E:
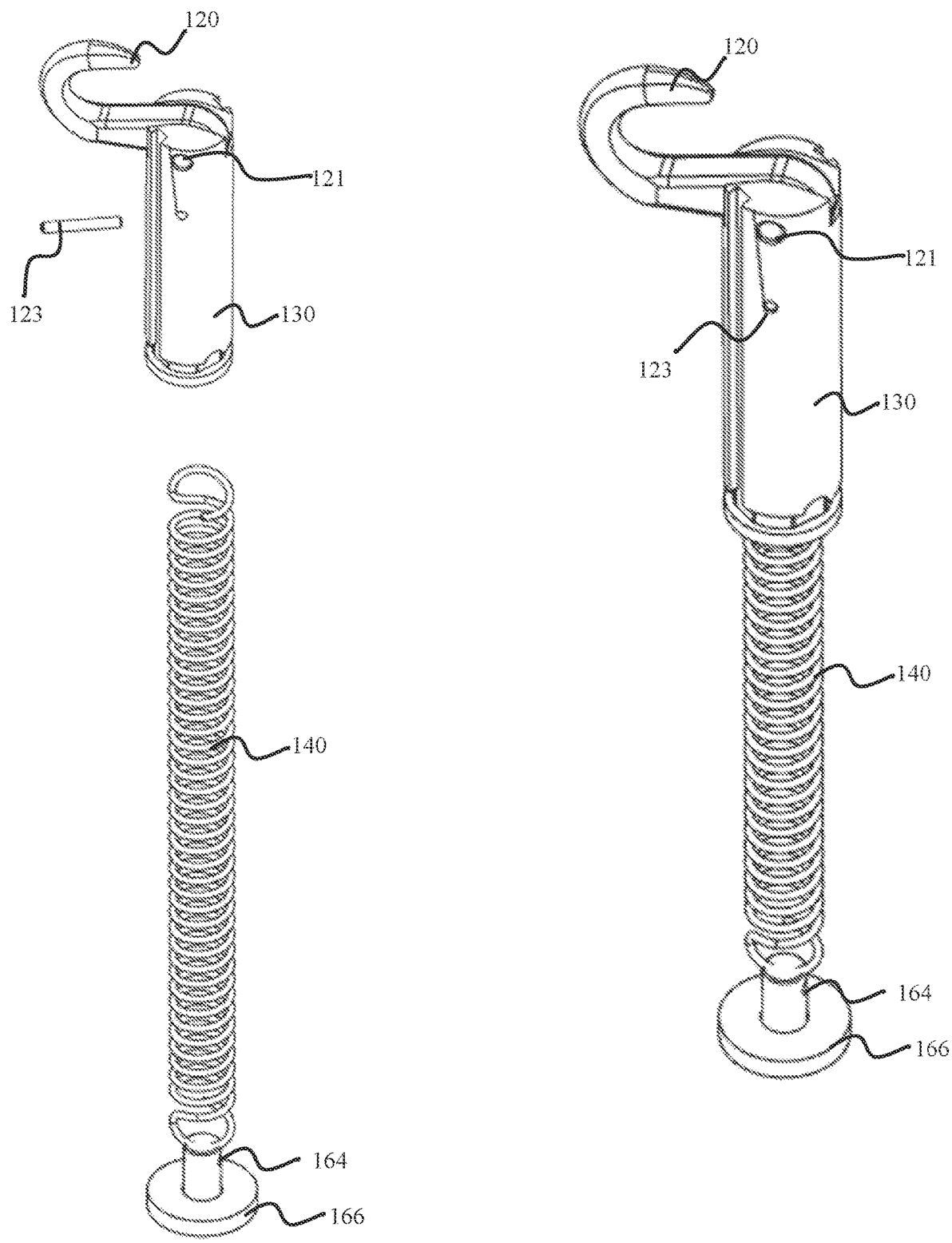
FIG. 3e illustrates a hook and shuttle before and after assembly with a shuttle spring and pin in accordance with an example.
Figure 3F:
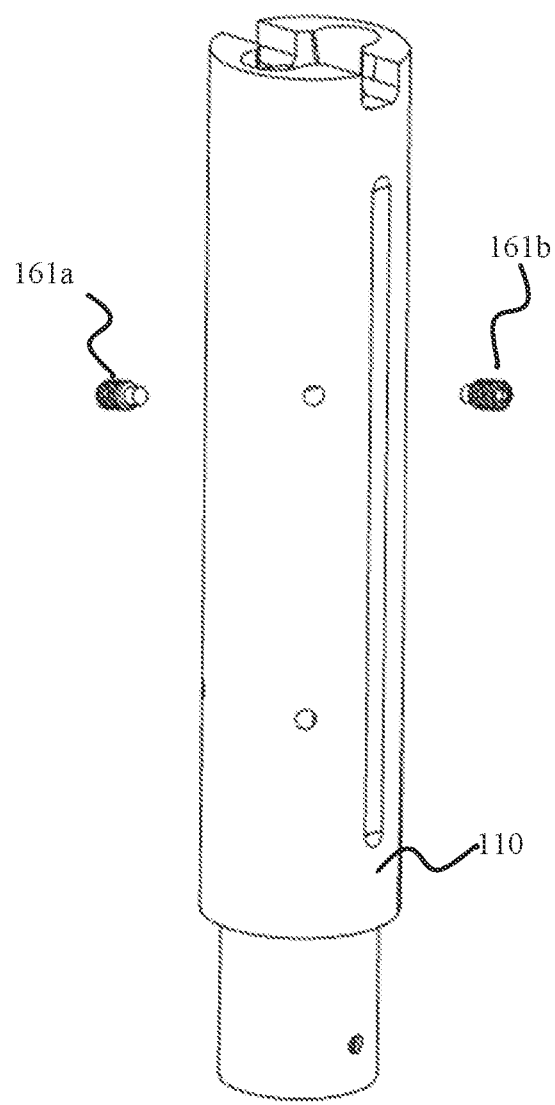
FIG. 3f illustrates a housing before assembly with set screws in accordance with an example.
Figure 3G:
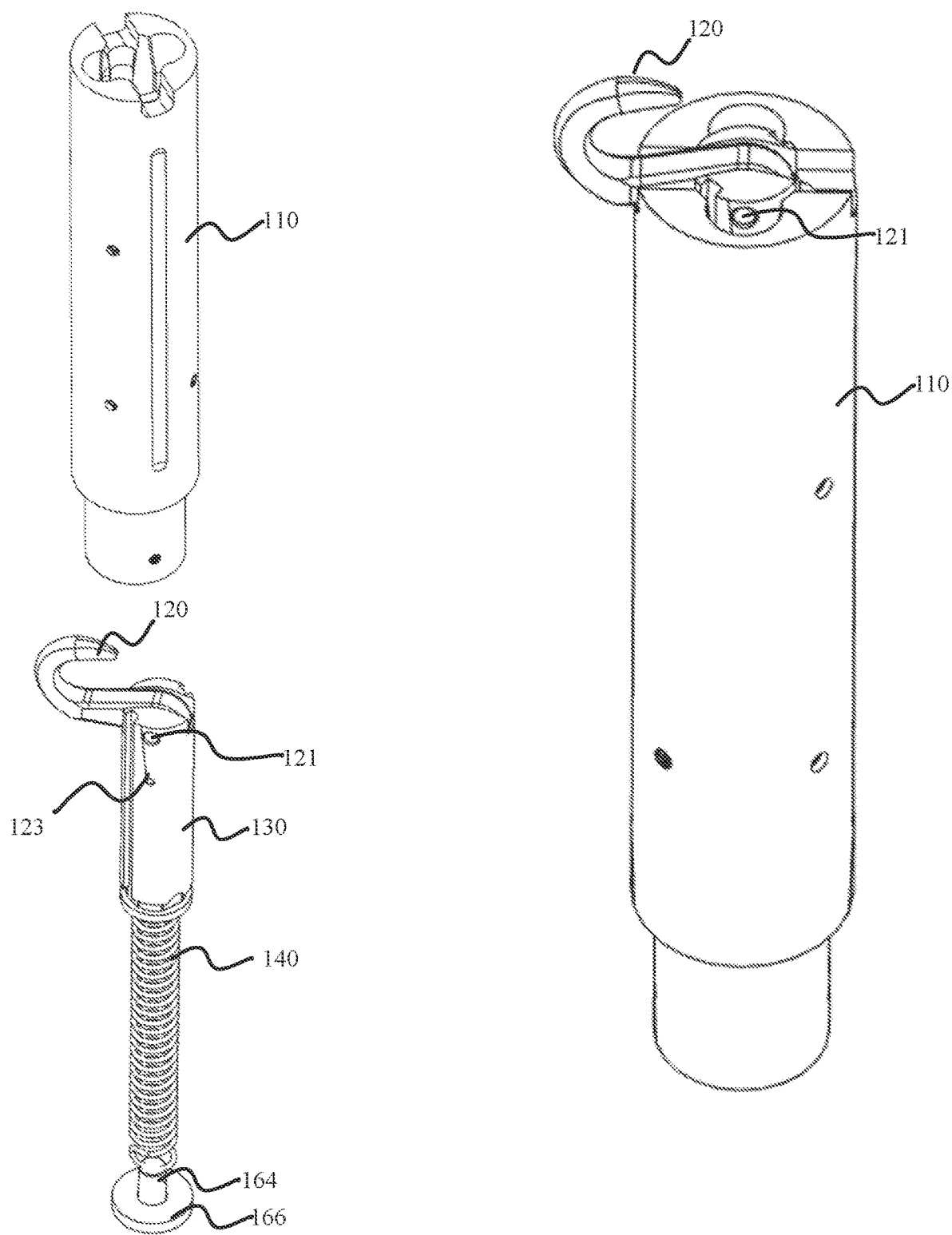
FIG. 3g illustrates the housing before and after assembly with the hook, shuttle, and shuttle spring in accordance with an example.
Figure 3H:
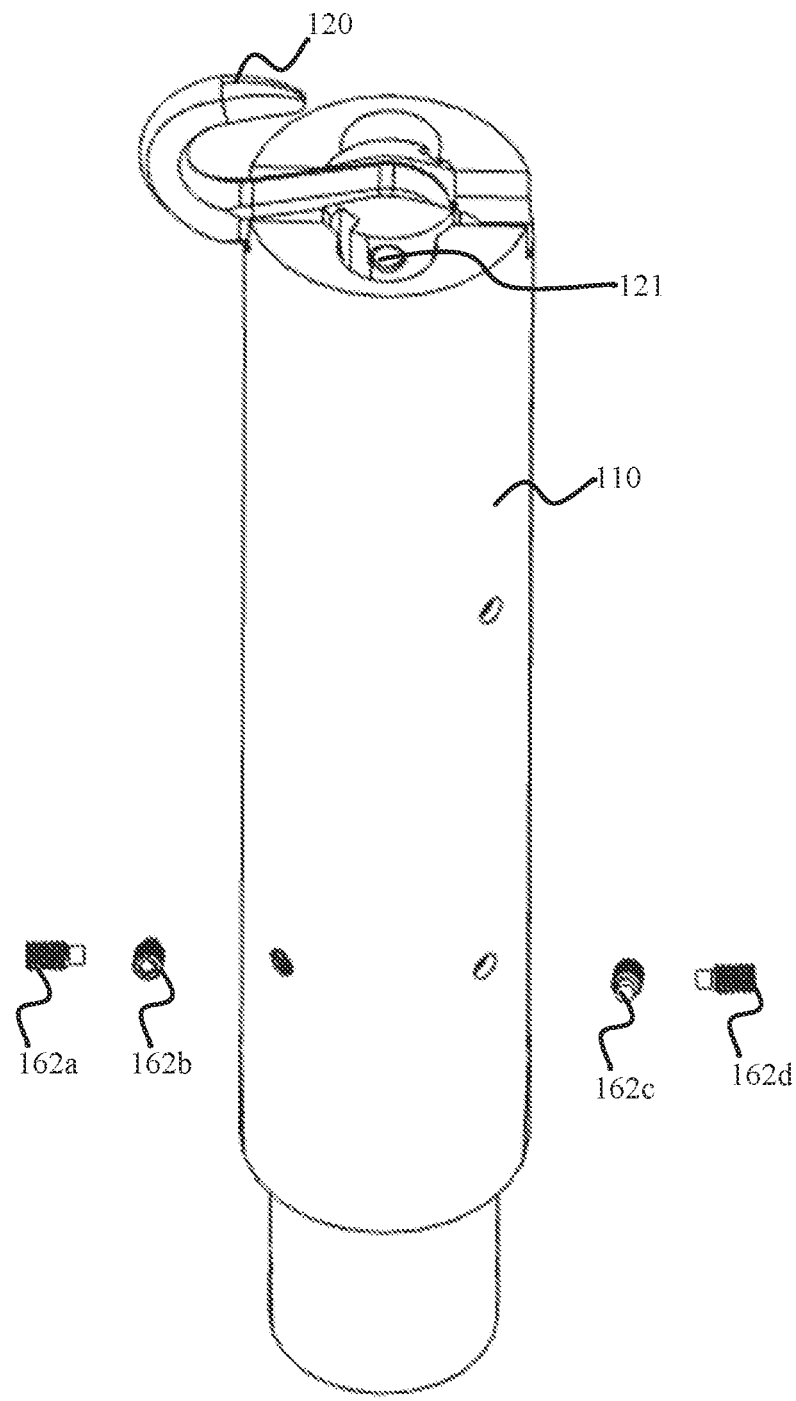
FIG. 3h illustrates the device before assembly with the retaining points in accordance with an example.
Figure 3I:
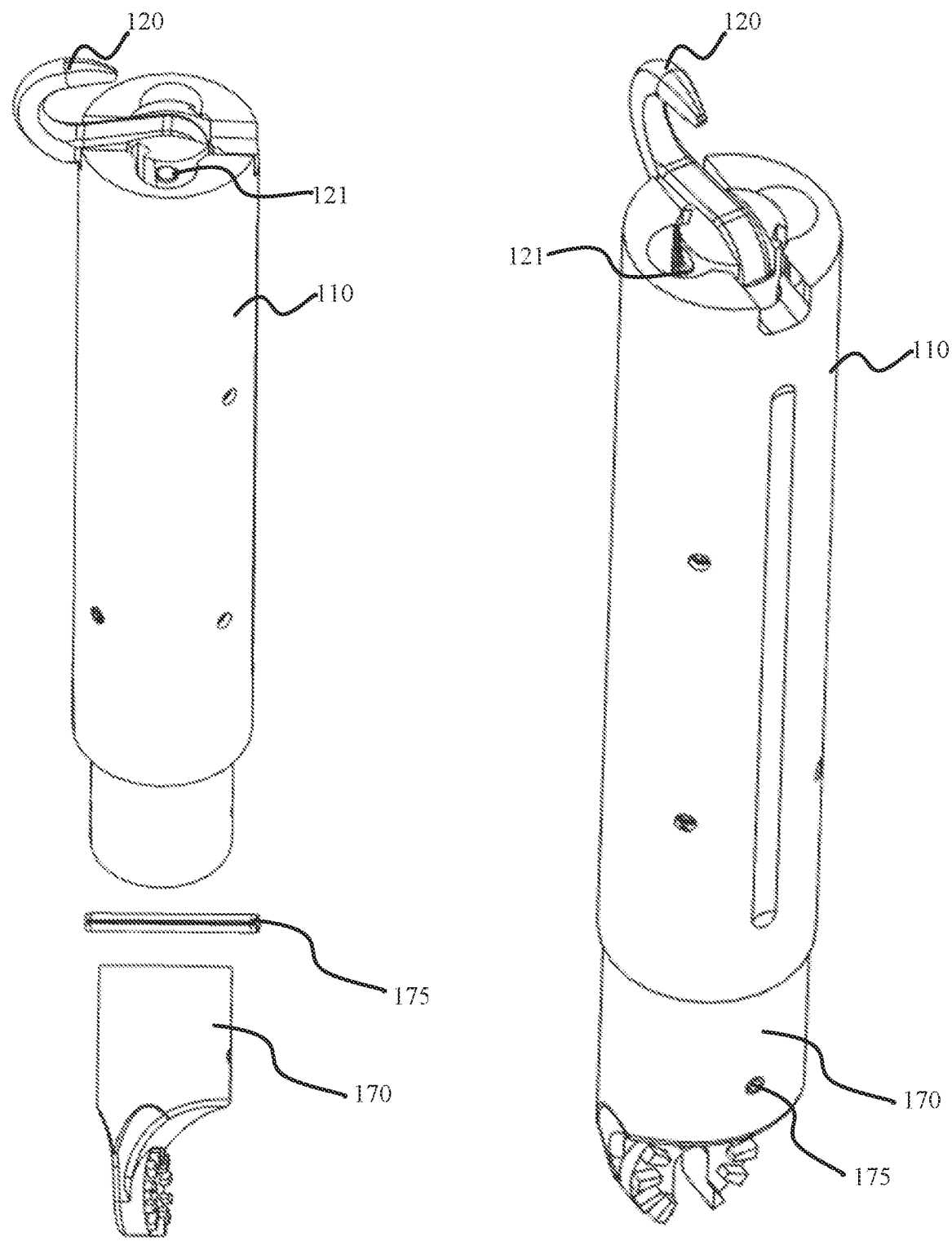
FIG. 3i illustrates the device before and after assembly with the head in accordance with an example.

In one example, as illustrated in FIG. 3b, in one operation the hook 120 can be operable to be secured to the shuttle 130 using the pin 121. The hook can be operable to pivot with respect to the shuttle 130. In one example, as illustrated in FIG. 3c, in one operation, a hook compression member 150 can be operable to contact a bottom portion of the hook 120. A screw 155 can retain the hook compression member 150 in contact with the bottom portion of the hook 120. In one example, as illustrated in FIG. 3d, in one operation, the washer 166 can be positioned in contact with the pin 166, which can be connected to the shuttle tensioning member 140. In one example, as illustrated in FIG. 3e, in one operation, the shuttle tensioning member 140 can be coupled to the shuttle 130 using the pin 123. In one example, as illustrated in FIG. 3f, in one operation, the protrusions 161a and 161b can be positioned into the housing 110 to guide movement of the circumferential 134 and vertical 132a, 132b tracks of the shuttle 130. In one example, as illustrated in FIG. 3g, in one operation, the housing 110 can be positioned to encase a portion of the hook 120, the shuttle 130, the shuttle tensioning member 140, the pin 164, and the washer 166. In one example, as illustrated in FIG. 3h, in one operation, the protrusions 162a, 162b, 162c, 162d can be positioned in the housing and operable to prevent retraction of the shuttle into the interior portion of the housing beyond a selected distance. In one example, as illustrated in FIG. 3i, in one operation, the head 170 can be connected to the housing 110 by a pin 175.

Figure 4A:
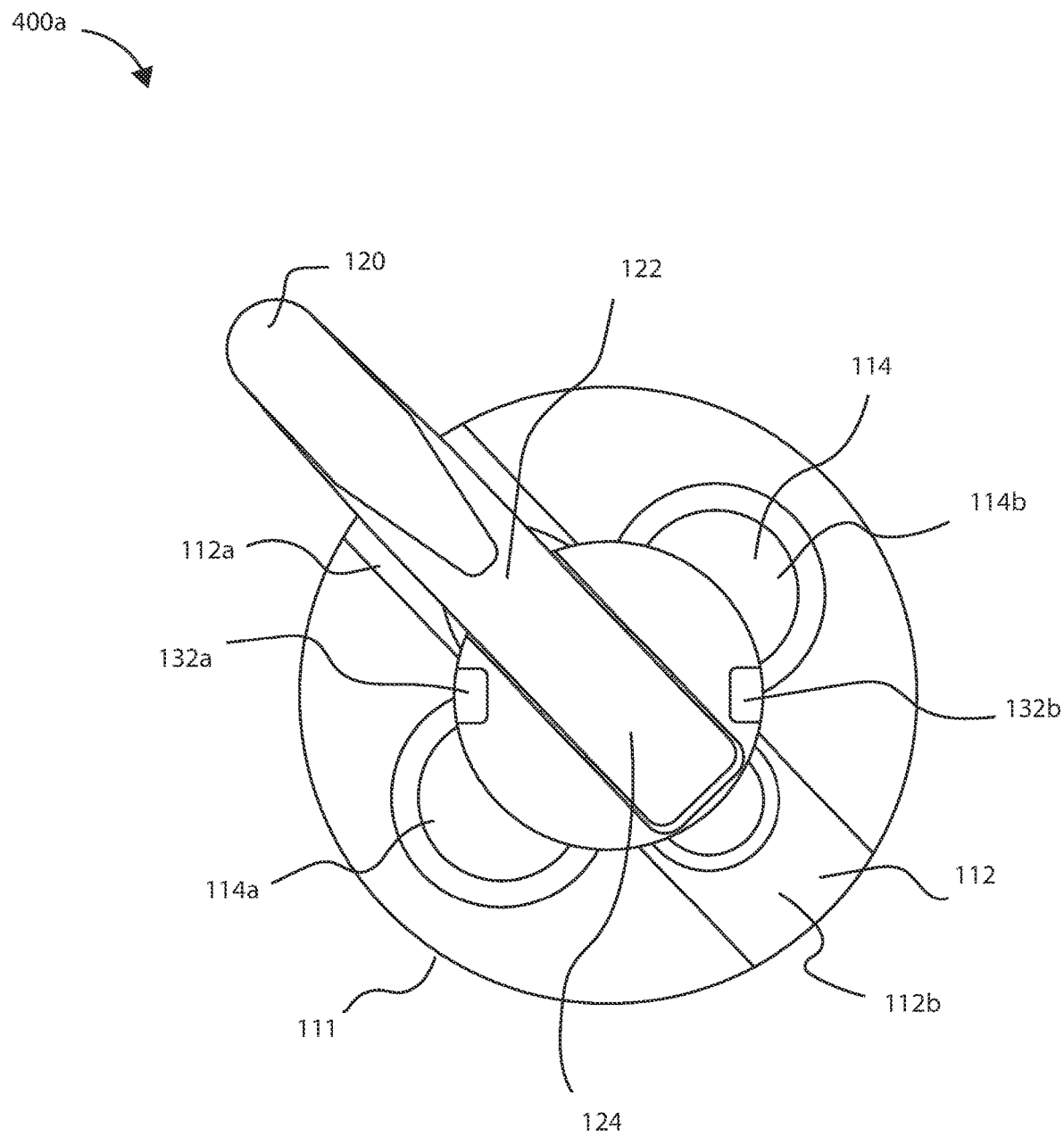
FIG. 4a illustrates a top-down view of the device in accordance with an example.

In one example, as illustrated in FIG. 4a, at a distal end of the housing, the device 400a can comprise a portion 120 of the hook 120 operable to pivot at the pivot point 124 in the first channel 112 at a first end 112a or in the first channel 112 at a second end 112b. The second channel 114 can comprise a first end 114a and a second end 114b. The first channel 112 can extend to a periphery 111 of the distal end of the housing. The shuttle can include a first vertical track 132a and a second vertical track 132b.

Figure 4B:
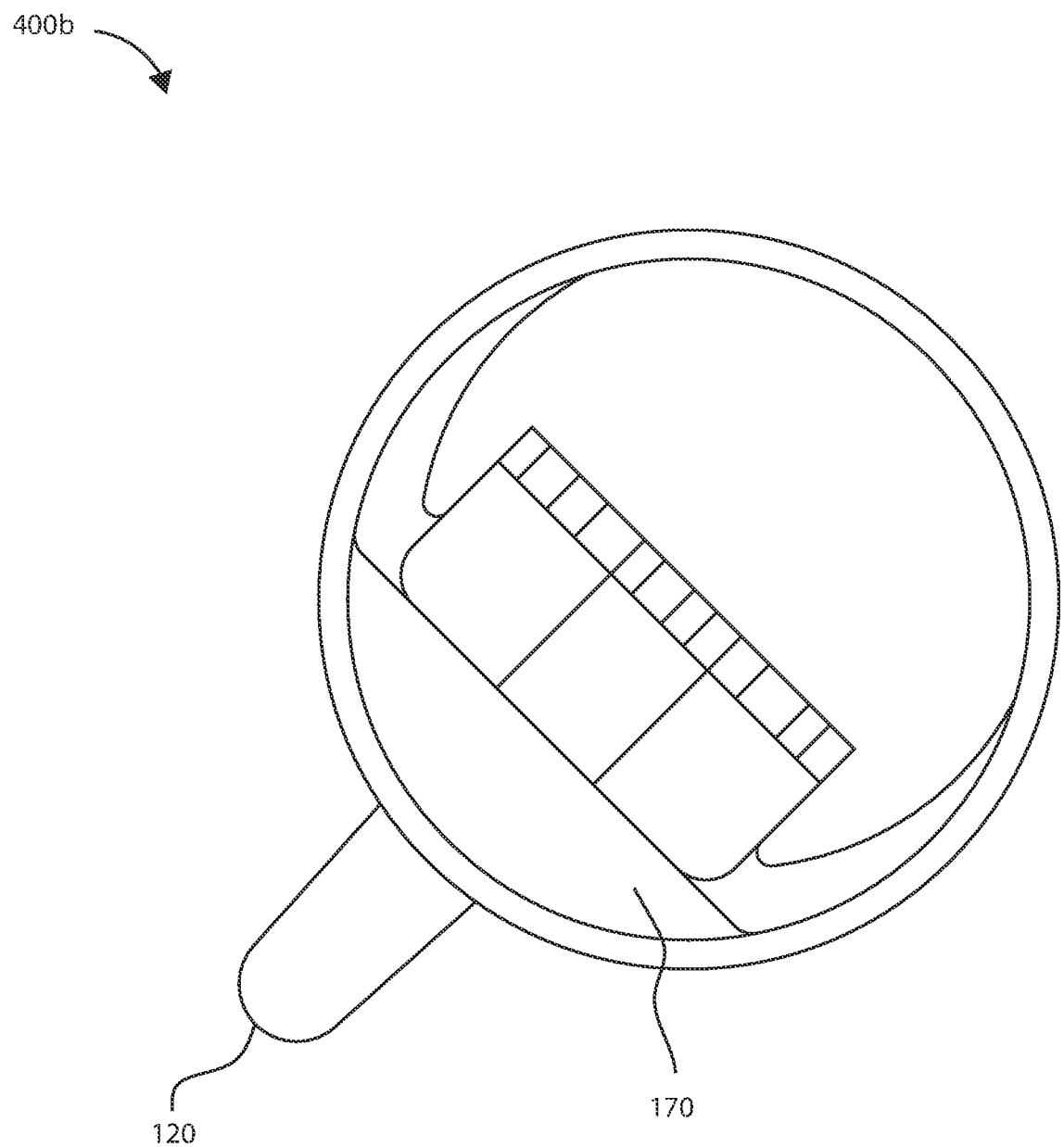
FIG. 4b illustrates a bottom-up view of the device in accordance with an example.
Figure 4C:
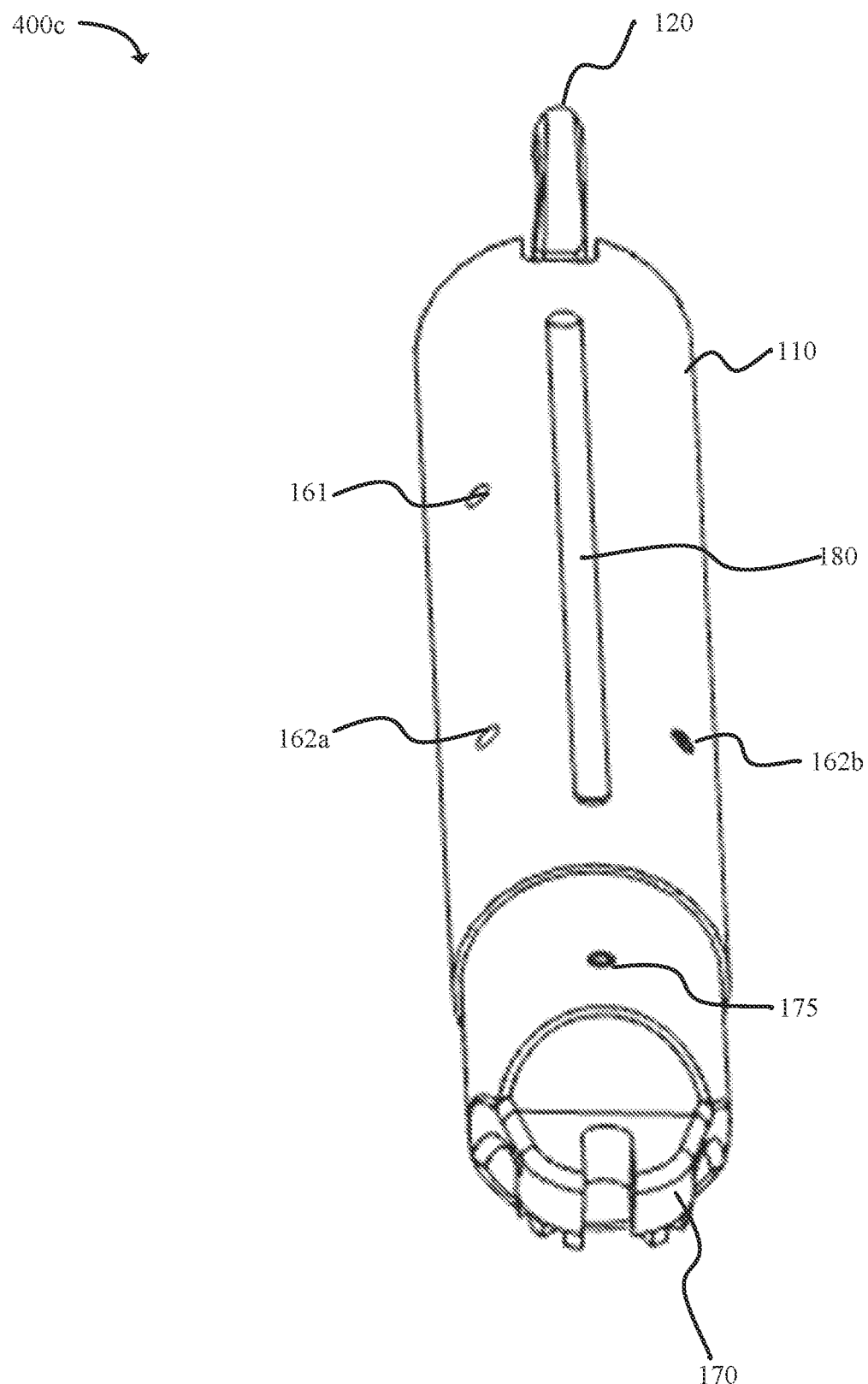
FIG. 4c illustrates a perspective view of the device in accordance with an example.
Figure 4D:
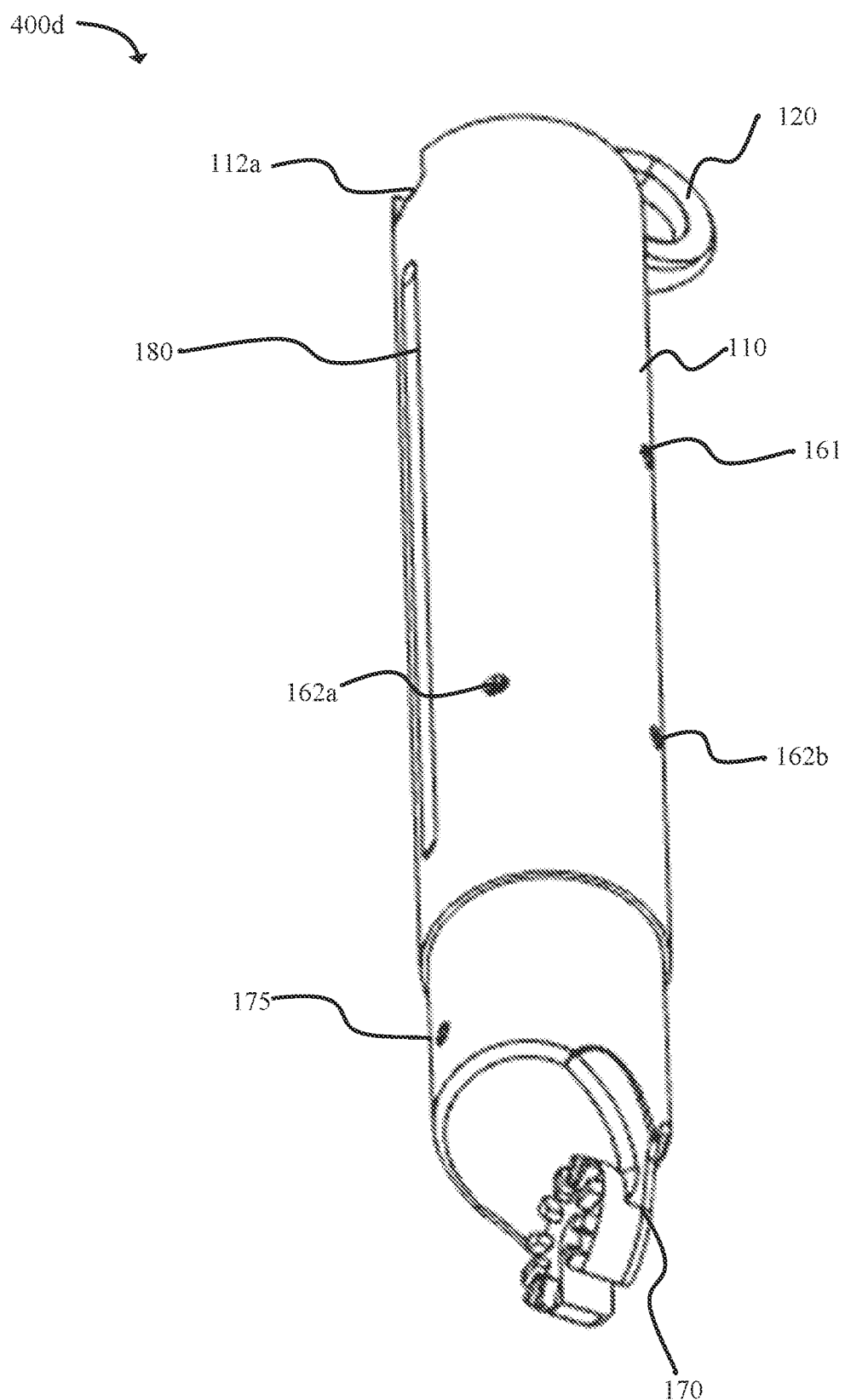
FIG. 4d illustrates a perspective view of the device in accordance with an example.
Figure 4E:
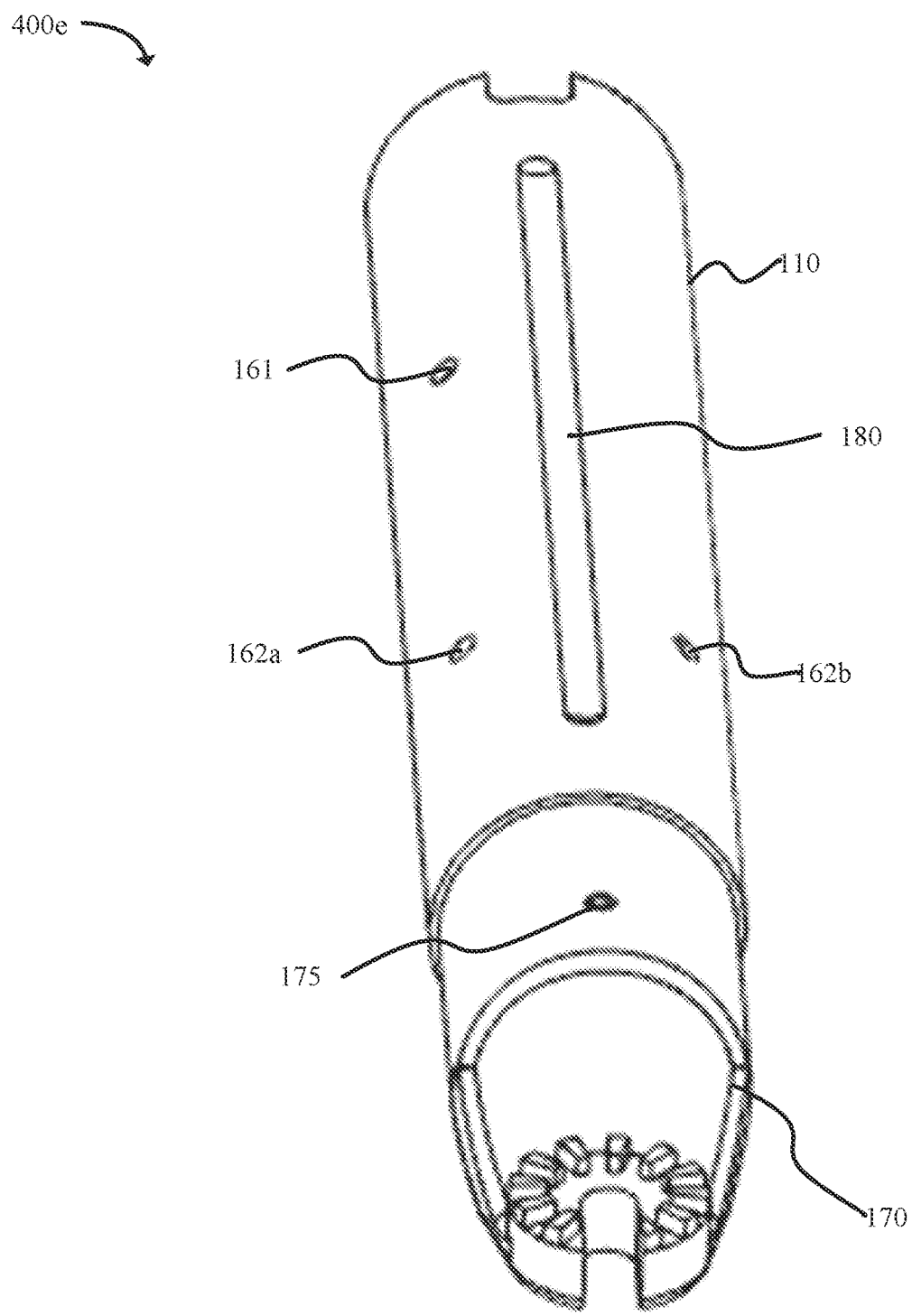
FIG. 4e illustrates a perspective view of the device in accordance with an example.
Figure 4F:
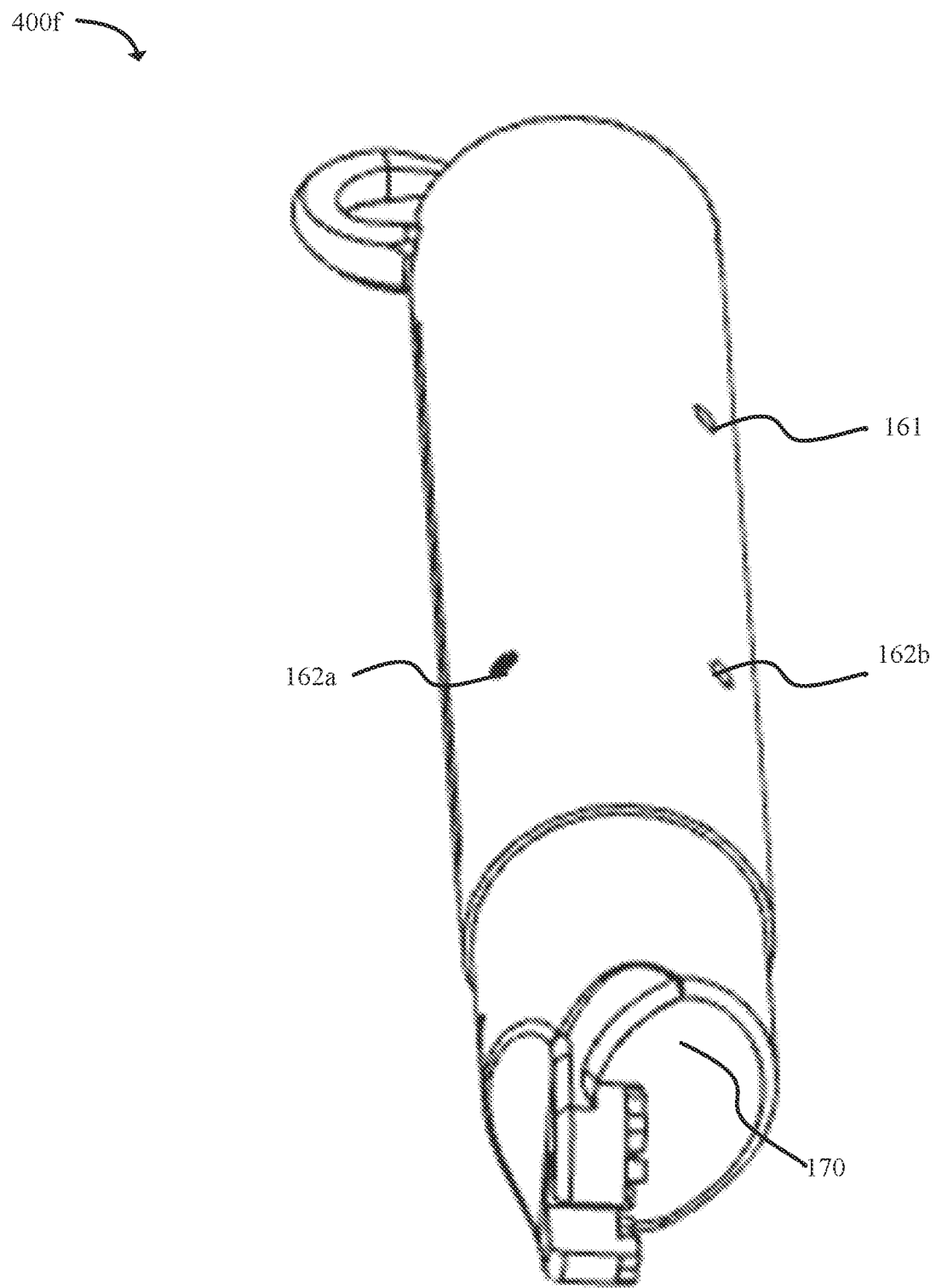
FIG. 4f illustrates a perspective view of the device in accordance with an example.

In one example, as illustrated in FIG. 4b, at a proximal end of the housing, the device 400b can comprise a hook 120 and a head 170.

In one example, as illustrated in FIGS. 4c-4f, at a perspective view the device 400c, 400d, 400e, 400f can comprise a hook 120. The proximal end of the housing 110 can comprise a head 170 that can be connected to the housing 110 using the pin 175. The protrusion 161 can be operable to guide movement of the shuttle in a circumferential or vertical direction. The protrusions 162a and 162b can prevent retraction of the shuttle beyond a selected distance into the interior portion of the housing 110. The device 400c can comprise an indicator 180 used to align the hook 120 to the first channel or the second channel.

Figure 4G:
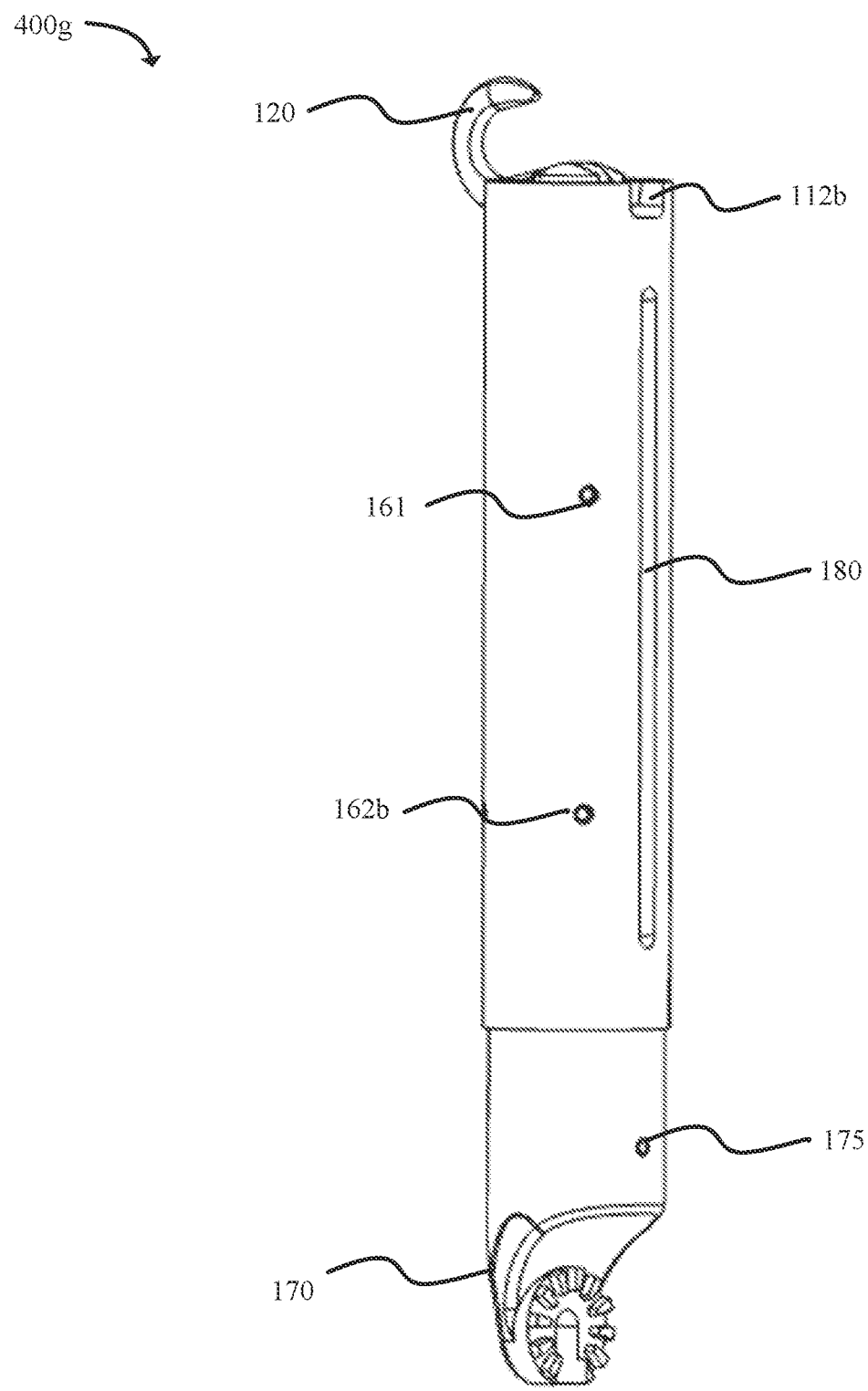
FIG. 4g illustrates a side view of the device in accordance with an example.
Figure 4H:
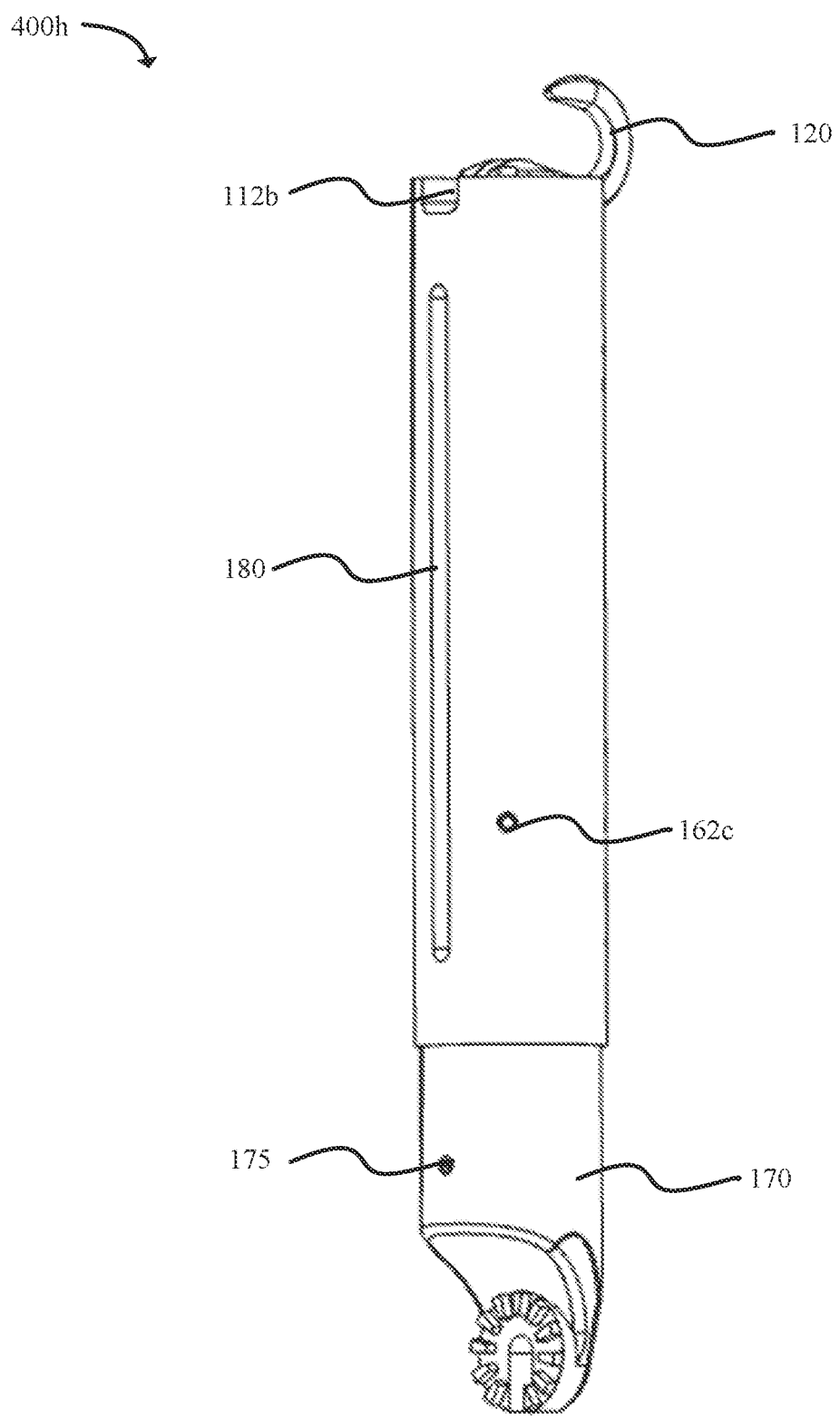
FIG. 4h illustrates a side view of the device in accordance with an example.
Figure 4I:
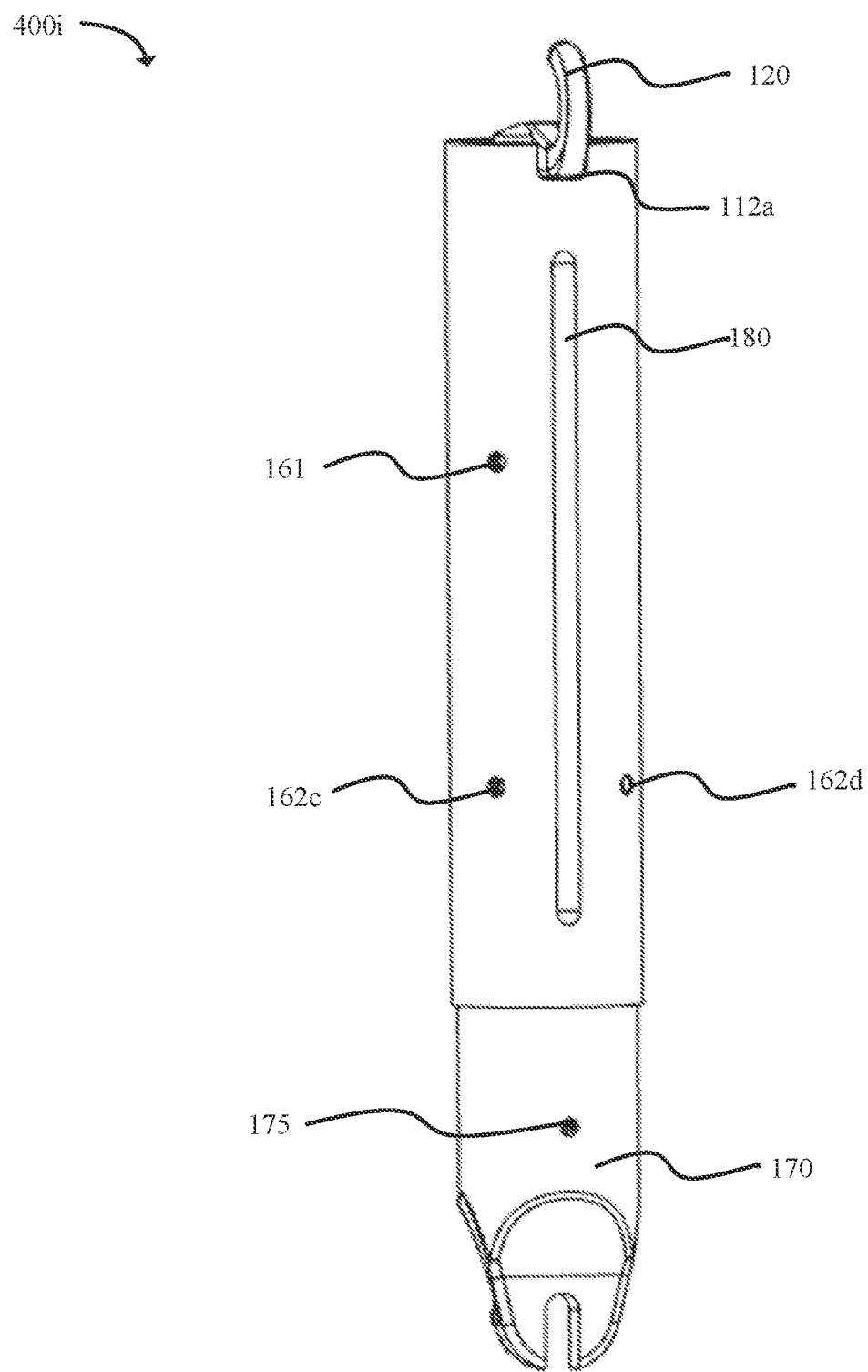
FIG. 4i illustrates a side view of the device in accordance with an example.
Figure 4J:
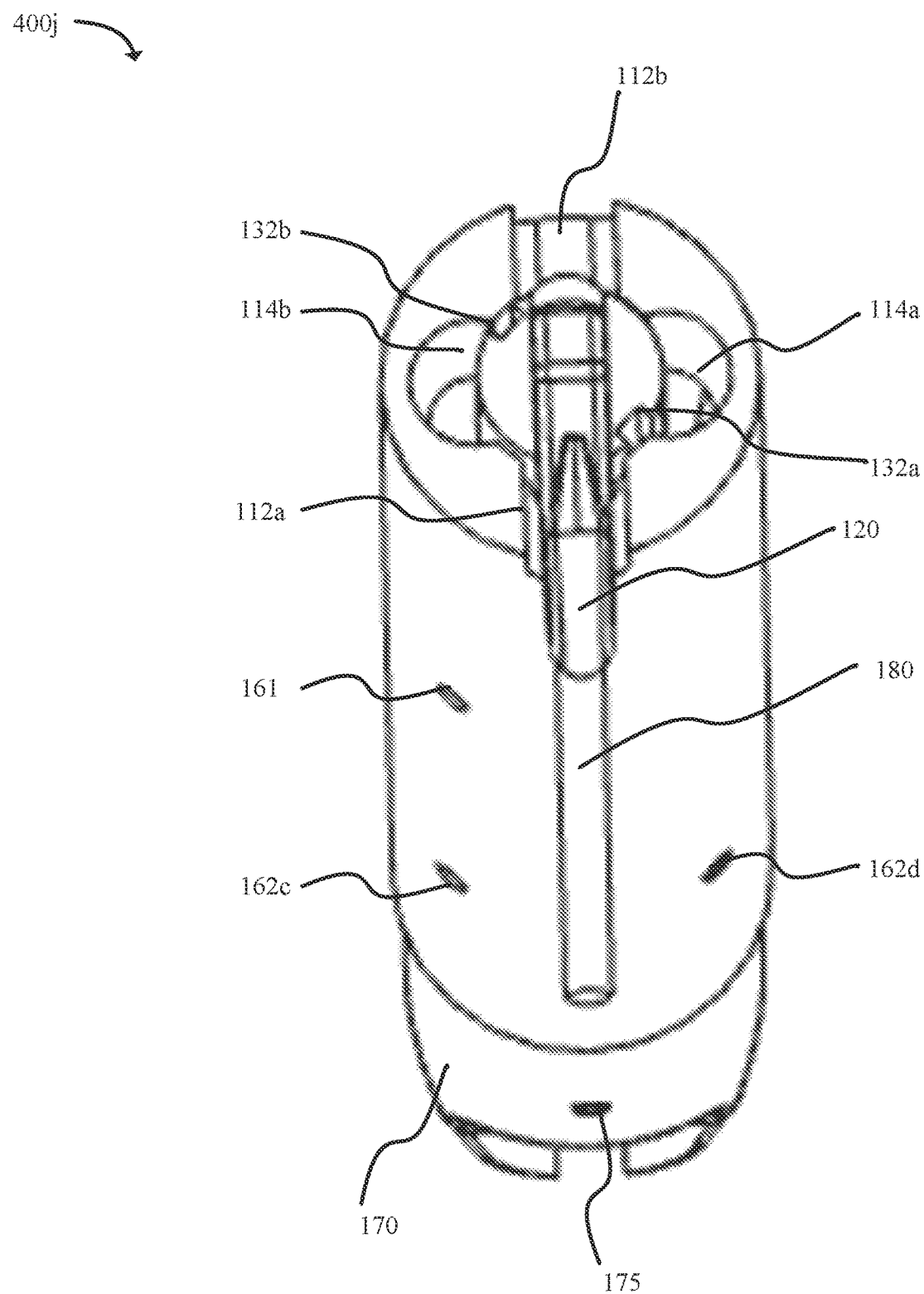
FIG. 4j illustrates a top perspective view of the device in accordance with an example.
Figure 4K:
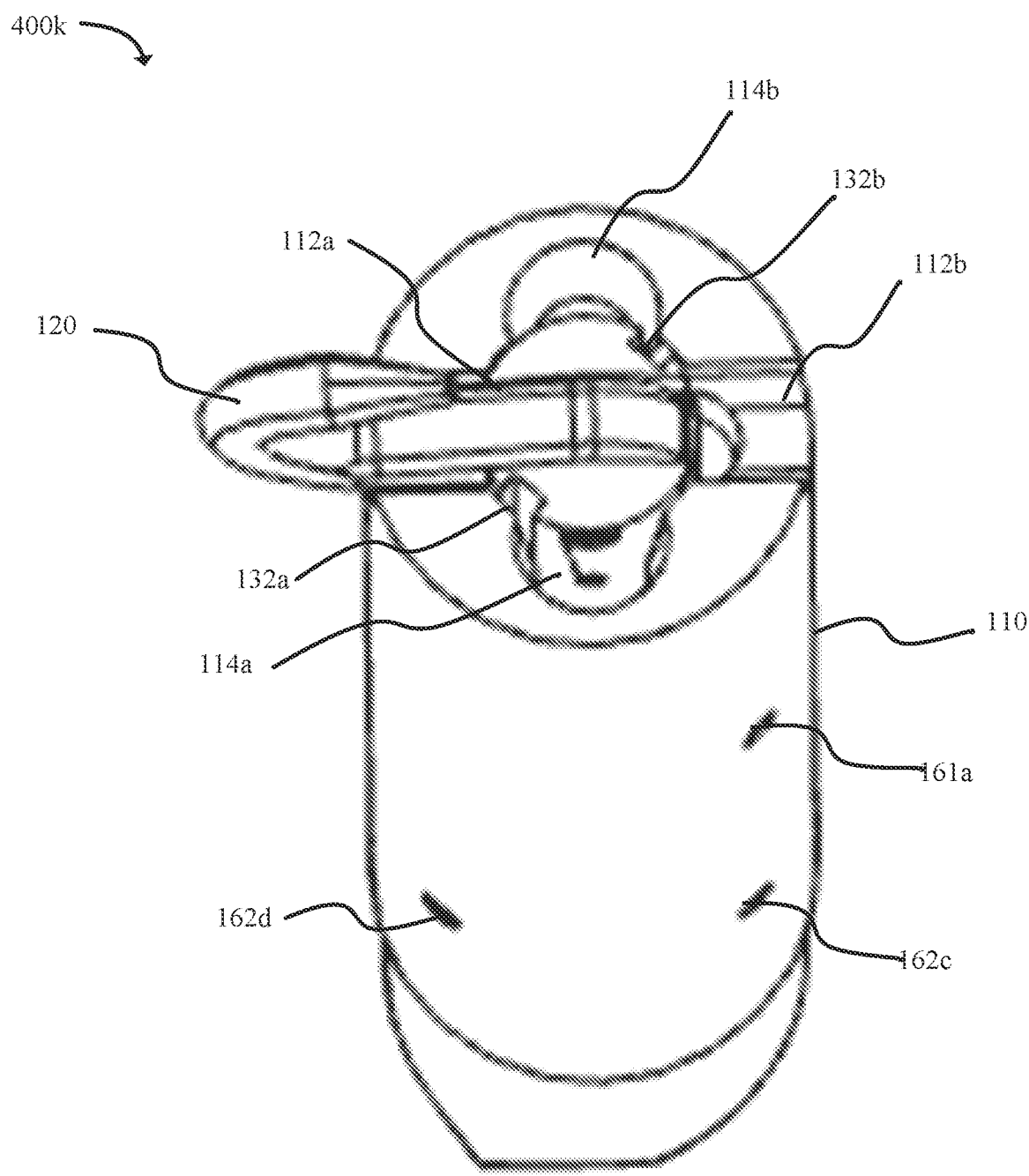
FIG. 4k illustrates a top perspective view of the device in accordance with an example.
Figure 4I:
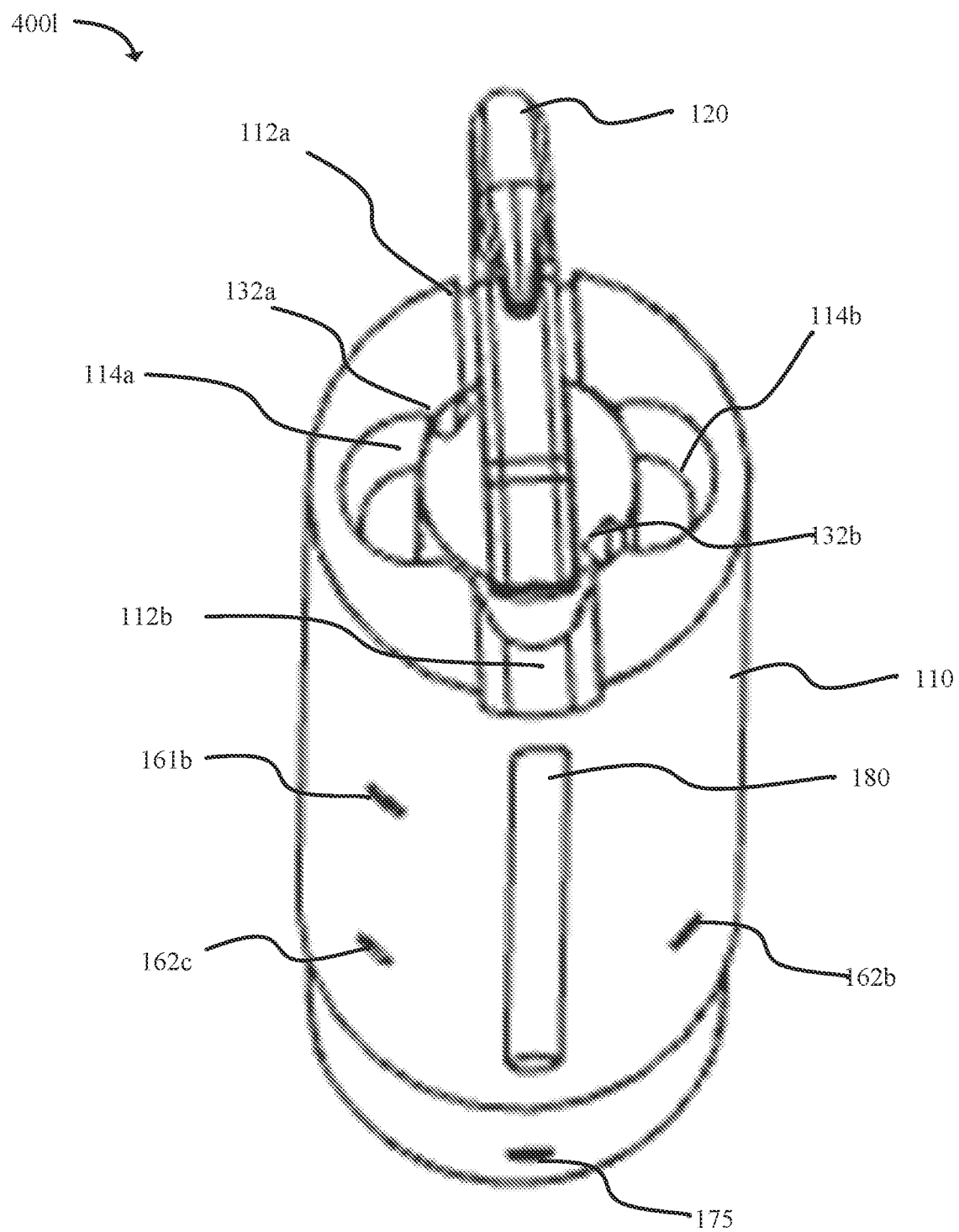
Figure 4M:
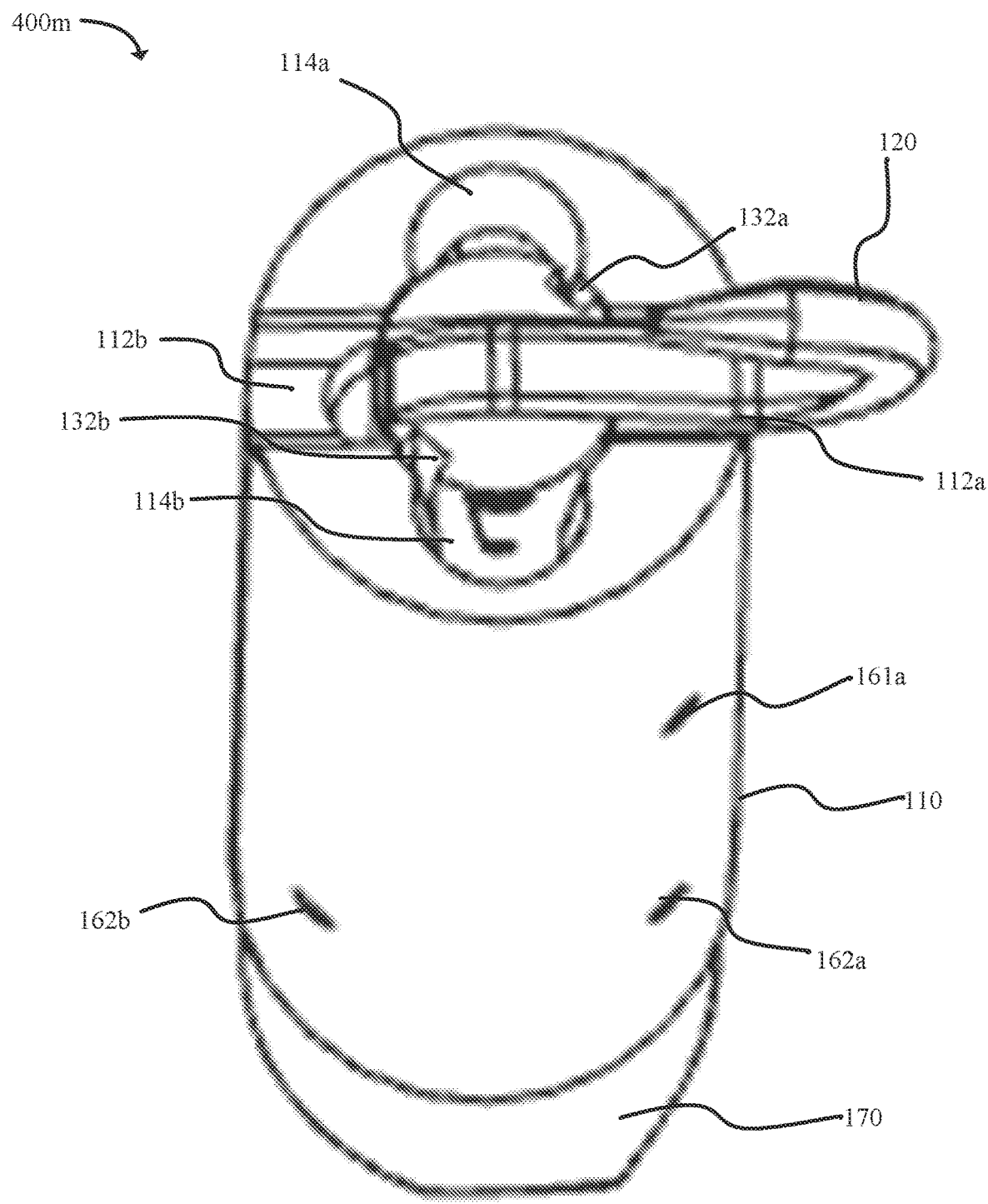
FIG. 4m illustrates a top perspective view of the device in accordance with an example.

In one example, as illustrated in FIGS. 4g-4i, a side view of the device 400g, 400h, 400i can comprise a hook 120, protrusion 161, protrusion 162a and 162b, indicator 180, pin 175, and head 170. The hook 120 can be operable to pivot into the first channel 112 at a first end 112a or a second end 112b.

In one example, as illustrated in FIGS. 4j-4m, a top perspective view of the device 400j, 400k, 400l, 400m can comprise the protrusion 161, the protrusions 162a, 162b, 162c, and 162d, an indicator 180, and a head 170 connected to the housing with a pin 175. In this example, the hook 120 can pivot into the first channel at a first end 112a or a second end 112b. The portion of the hook 120 after pivoting out of the first channel 112 and rotated to align with the second channel 114a, 114b can be operable to retract into the interior portion 115 of the housing 110. At least a portion 122 of the hook 120 can be operable to retract into the interior portion 115 of the housing 110 when the vertical track 132a, 132b is guided by the protrusions 161 into the interior portion 115 of the housing 110.

Figure 5A:
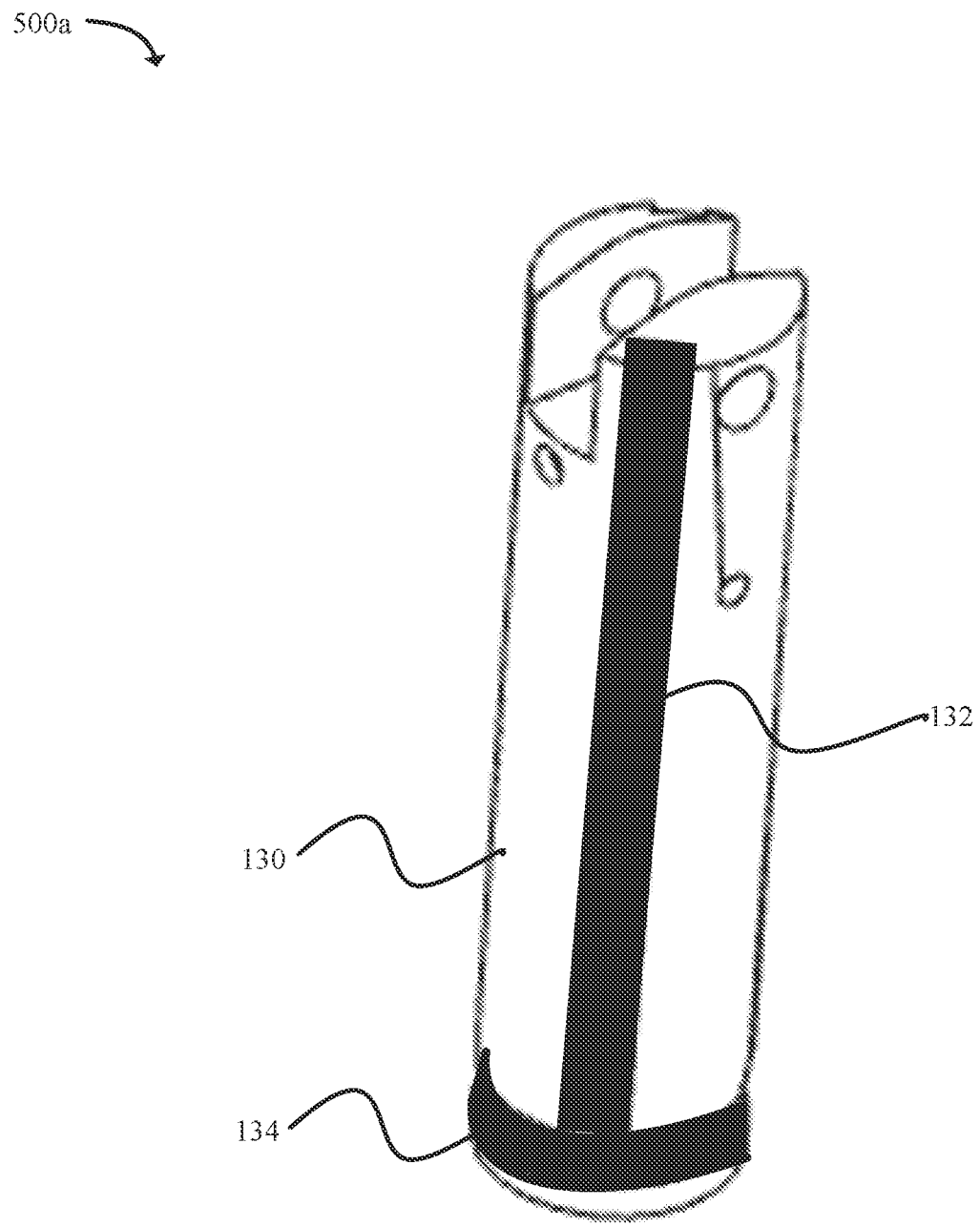
FIG. 5a illustrates a perspective view of a shuttle in accordance with an example.

In one example, as illustrated in FIG. 5a, the vertical guide 132 can be a vertical protrusion on the shuttle 130, and the circumferential guide 134 can be a circumferential protrusion. In this example, the interior shell of the housing 110 can have vertical protrusions operable to guide the shuttle 130 to retract into an interior portion 115 of the housing 110 and circumferential protrusions 134 operable to guide the shuttle 130 to rotate when the shuttle 130 has retracted into the interior portion 115 of the housing 110.

Figure 5B:
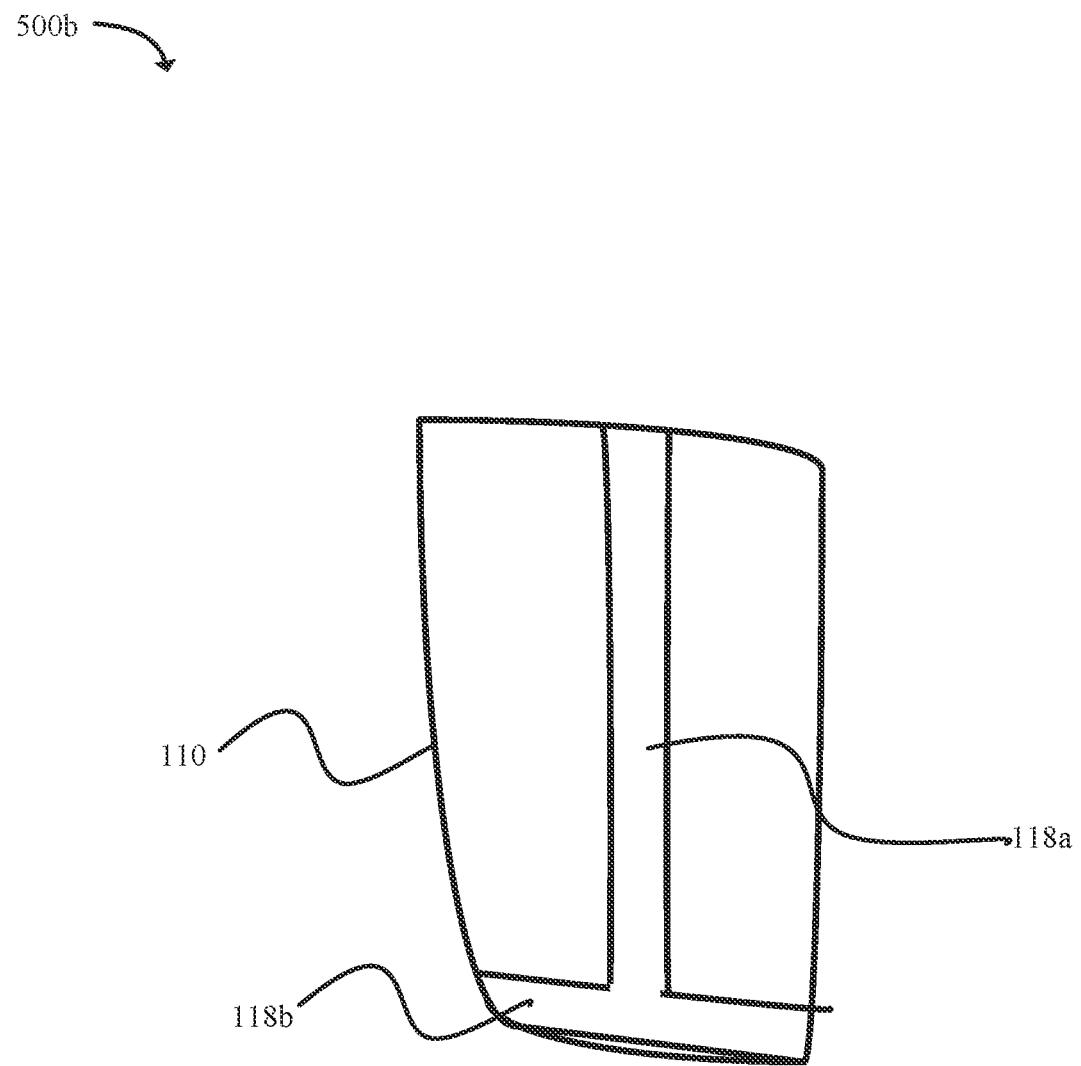
FIG. 5b illustrates a side view of an interior of a housing in accordance with an example.

In one example, as illustrated in FIG. 5b, the interior shell of the housing 110 can comprise a vertical track 118a for guiding a vertical protrusion of the shuttle 130 to allow the shuttle to retract into the interior portion 115 of the housing 110 or to extend from a retracted position. The interior shell of the housing 110 can further comprise a circumferential track 118b for guiding a circumferential protrusion 134 of the shuttle 130 to rotate with respect to the housing 110.

Figure 6:
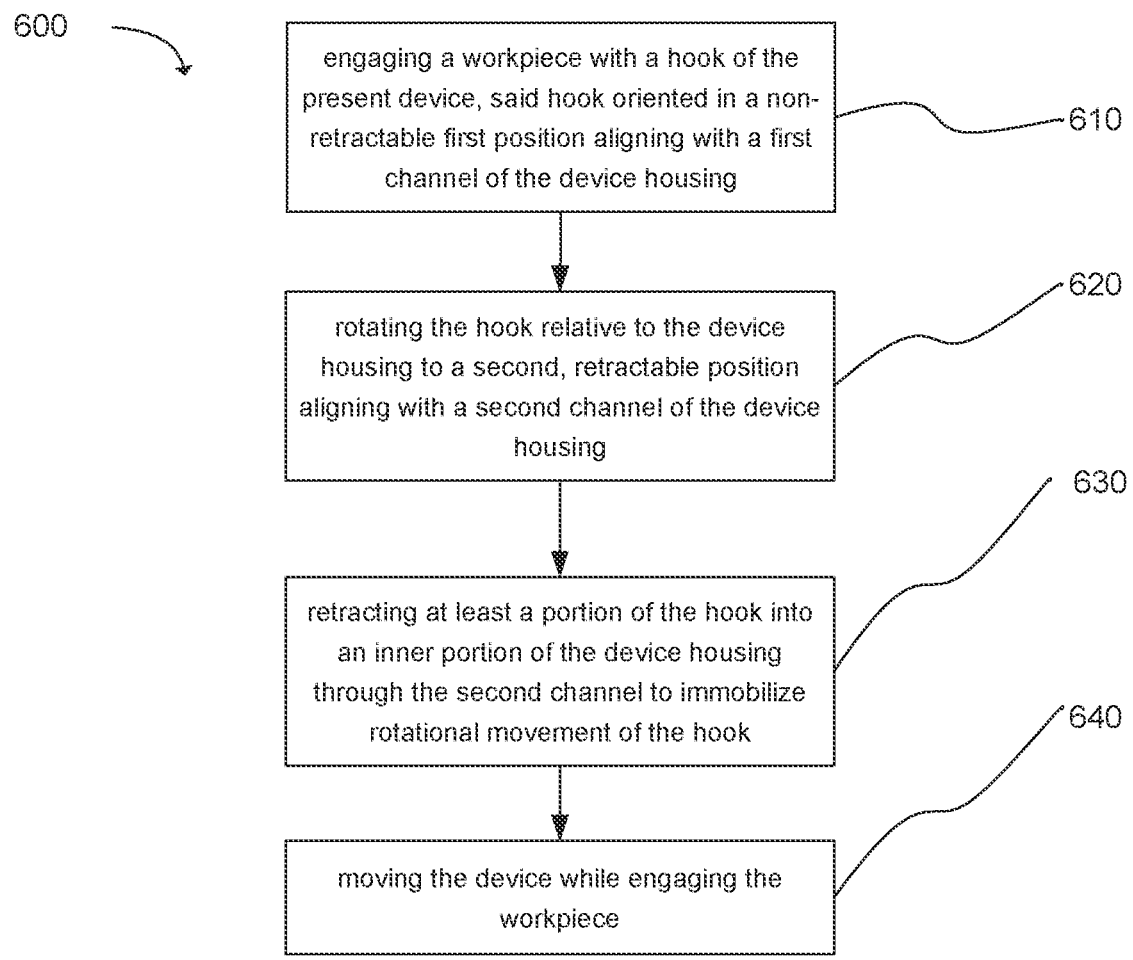
FIG. 6 depicts functionality for moving a workpiece in accordance with an example.

Another embodiment provides a method 600 for engaging a workpiece (e.g., an eyelet, an eye hook, screws, a cable, or other structure, including rotatable structures) on or attached to another device, such as surface (e.g. fascia or soffit), or a cable, such as a power line (e.g., a live line), an electrical cable, a hanging wire, or the like as shown in the flow chart in FIG. 6. The method can comprise securing the workpiece to a hook 120 of a device 100, said hook oriented in a non-retractable first position aligning with a first channel of the device housing, as in block 610. The method can further comprise rotating the hook 120 relative to the device housing to a second retractable position aligning with a second channel of the device housing, as in block 620. The method can yet further comprise retracting at least a portion 122 of the hook 120 into an inner portion 115 of the device housing 110 through the second channel to immobilize rotational movement of the hook, as in block 630. At this point, the workpiece may be aligned with and enter into the first channel and be secured therein between the sides of the channel and the inner perimeter of the hook. The method can additionally comprise moving or otherwise manipulating (e.g. rotating) the device to move the workpiece, as in block 640. In one example, the workpiece can be removed from a cable, such as a power line (e.g., a live line), an electrical cable, a hanging wire, or the like.

In another example, operations for removing a workpiece from a cable (e.g., a power line, a live line, an electrical cable, or the like) or moving a workpiece to a different cable (e.g., a power line, a live line, an electrical cable, or the like) can include: (i) securing the workpiece to a hook 120 of a device 100 in a non-retractable first channel orientation; (ii) rotating a portion (e.g., an eyelet) of the workpiece to a retractable second channel orientation, (iii) retracting at least the portion of the workpiece into an inner portion 115 of the housing 110 of the device 100, and (iv) rotating the device to remove the workpiece from the cable (e.g., a power line, a live line, an electrical cable, or the like).

In one example, operations for removing, moving, transferring, or rotating a workpiece (e.g., a powerline) can include: (a) securing the workpiece (e.g., a powerline) to a hook 120 of a device 100 in a non-retractable first channel orientation; (ii) rotating a portion of the workpiece (e.g., a powerline) to a retractable second channel orientation, (iii) retracting at least the portion of the workpiece (e.g., a powerline) into an inner portion 115 of the housing 110 of the device 100, and (iv) rotating the device to remove the workpiece (e.g., a powerline). In one example, the workpiece can be a powerline that can be removed from, moved to, transferred to or from, or rotated on various support structures (e.g., utility poles).

In one aspect, the method can include retracting the hook 120 into an interior portion 115 of the housing 110 using a longitudinal guide 132a, 132b of a shuttle 130 coupled to the hook 130. In another aspect, the method can include rotating the hook 120 from a first-channel orientation to a second-channel orientation using a circumferential guide 134 of a shuttle 130 coupled to the hook 120. In another aspect, the method can include switching between a circumferential guide 134 for rotation to a longitudinal guide 132a, 132b for retraction or extension.

In another aspect, the method can include, pivoting a portion 122 of the hook 120 out of a first channel 112 of the housing 110. In another aspect, the method can include, retracting at least a portion 122 of the hook 120 into the interior portion 115 of the housing 110 using a shuttle tensioning member 140. In another aspect, the method can include engaging a workpiece in a first channel 112. In another aspect, the method can include withstanding torsional force from the workpiece to a first channel 112 of the device 100.

In another aspect, a method is provided for unhooking a workpiece from the device 100. In one aspect, the method can include rotating the hook 120 when in an interior housing 110 of the device 100 to engage the workpiece to a power line. In another aspect, the method can include pulling the device 100 to extend the at least a portion of the hook 120 out of the interior portion 115 of the housing 110. In another aspect, the method can include rotating the hook 120 from the retractable second channel orientation to a non-retractable first channel orientation. In yet another aspect, the method can include pivoting the at least a portion of the hook 120 into a first channel 112 to unhook the workpiece.

In another aspect, the method can include positioning the at least a portion 122 of the hook 120 in a first channel 112 of the housing 110 using a hook compression member 150. In another aspect, the method can include stopping retraction of the hook 120 beyond a threshold interior portion of the housing 110 using protrusions 162a, 162b, 162c, 162d. In another aspect, the method can include coupling a distal end 110b of the housing to a rod.

Figure 7:
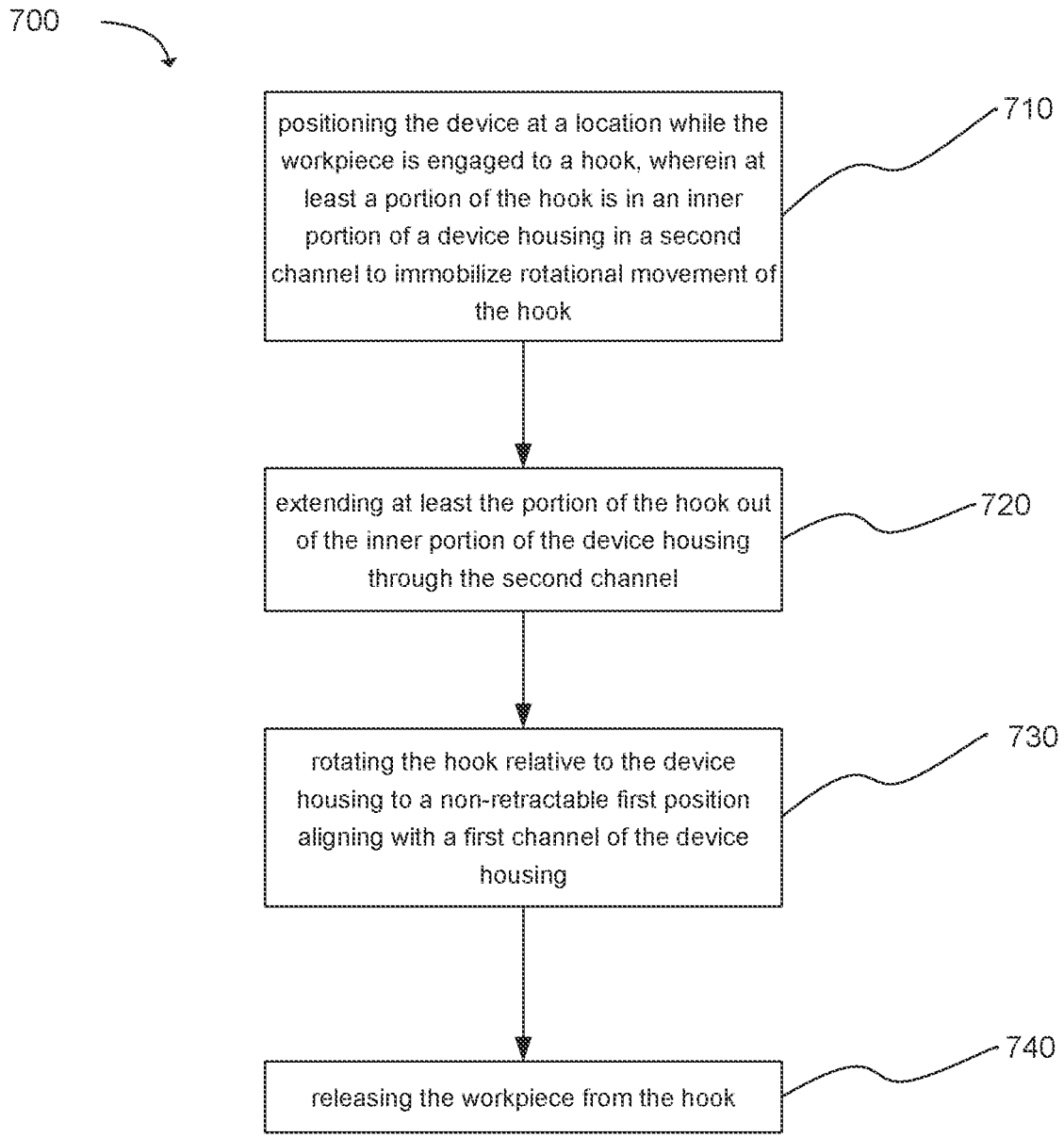
FIG. 7 depicts functionality for positioning a workpiece in accordance with an example.

Another embodiment provides a method 700 of positioning a workpiece (e.g., an eyelet, an eye hook, screws, a cable, or other structure, including rotatable structures) at a location, such as another device or a surface (e.g., fascia or soffit), as shown in the flow chart in FIG. 7. The method can comprise positioning the device 100 at a location while the workpiece is engaged to a hook 120, wherein at least a portion 122 of the hook 120 is in an inner portion 155 of a device housing 110 in a second channel 114 to immobilize rotational movement of the hook 120, as in block 710. At this point, the workpiece may be aligned with and in the first channel 112 and be secured therein between the sides of the channel 112 and the inner perimeter of the hook 120. The method can comprise extending at least the portion 122 of the hook 120 out of the inner portion 115 of the device housing 110 through the second channel 114, as in block 720. The method can comprise rotating the hook 120 relative to the device housing 110 to a non-retractable first position aligning with a first channel 112 of the device housing 110, as in block 730. The method can include releasing the workpiece from the hook 120, as in block 740. In one example, the workpiece can be positioned at a location that is a cable, such as a power line (e.g., a live line), an electrical cable, a hanging wire, or the like.

In one example, operations for reattaching a workpiece to a cable (e.g., a power line, a live line, an electrical cable, or the like) can include: (i) engaging the workpiece to a cable (e.g., a power line, a live line, an electrical cable, or the like), (ii) rotating the at least a portion 122 of the hook 120 when engaged in the second channel 114 to secure the workpiece to the cable (e.g., a power line, a live line, an electrical cable, or the like), (iii) pulling down on the device 100 to extract at least a portion 122 of the hook 120 from the interior portion of the housing 110, (iii) rotating the hook 120 from the second channel orientation to the first channel orientation, and (iv) pivoting the at least a portion 122 of the hook 120 into the first channel 112 to unhook the workpiece from the hook 120.

In one example, operations for reattaching a workpiece (e.g., a powerline) can include: (a) engaging the workpiece (e.g., a powerline) to a hook of device, (ii) rotating the at least a portion 122 of the hook 120 when engaged in the second channel 114 to secure the workpiece (e.g., a powerline), (iii) pulling down on the device 100 to extract at least a portion 122 of the hook 120 from the interior portion of the housing 110, (iii) rotating the hook 120 from the second channel orientation to the first channel orientation, and (iv) pivoting the at least a portion 122 of the hook 120 into the first channel 112 to unhook the workpiece (e.g., a powerline) from the hook 120. In one example, the workpiece can be a powerline that can be reattached to various support structures (e.g., utility poles).

In one aspect, a method is provided for unhooking the workpiece from the hook 120. In one aspect, the method can include rotating the at least a portion 122 of the hook 120 when engaged in the second channel 114 to secure the workpiece to a cable (e.g., a power line). In another aspect, the method can include pulling the hook 120 to extend the at least a portion 122 of the hook 120 out of the second channel 114. In another aspect, the method can include rotating the hook 120 from the second channel orientation to the first channel orientation. In yet another aspect, the method can include pivoting the at least a portion 122 of the hook 120 into the first channel 112 to unhook the workpiece from the hook 120.

The workpiece described with reference to FIGS. 1 to 7 can be any suitable structure having a cross section operable to engage the hook 120 of the device 100. In one example, the workpiece can be a ring structure (e.g., an eyelet of a power line clamp or hotline clamp), a hook (e.g., an eyehook, a light hook, or the like), a fastener (e.g., a screw), a cable (e.g., a power line, a live line, an electrical cable, a hanging wire, or the like), the like, or a combination thereof. In one example, when the hook attaches to the workpiece and is rotated from a first channel orientation to a second channel orientation, at least a portion of the workpiece can be operable to fit into the second channel 114 of the device 100. In another example, the workpiece can be a ring structure, a partial ring structure, or any other suitable structure operable to fit within the diameter of the hook 120 of the device 100.

EXAMPLES

In one embodiment, a device 100 can comprise a housing 110 having a proximal end 110a and a distal end 110b. In one aspect, the proximal end can be operable to couple with a rod, and the distal end 110b can have first 112 and second 114 intersecting channels 112, 114. In one aspect, the first channel 112 can provide access to an interior portion 115 of the housing 110. In one aspect, a hook 120 can be retractably and rotatably coupled to the housing 110. In one aspect, the hook 120 may not be retractable into the interior portion 115 of the housing 110 when the hook 120 is aligned with the first channel 112. In one aspect, the hook can be at least partially retractable into the interior portion 115 of the housing 110 when the hook 120 is aligned with the second channel 114.

In one aspect, the hook 120 can be fully retractable into the interior portion 115 of the housing 110 when the hook 120 is aligned with the second channel 114.

In one aspect, the first channel 112 can be operable to engage a workpiece.

In one aspect, the first channel 112 can comprise a slot.

In one aspect, the slot can be a substantially flat slot.

In one aspect, the first channel 112 can extend to an edge 111 of a periphery of the distal end 110b.

In one aspect, the first channel 112 can be operable to withstand a torsional force from the workpiece.

In one aspect, the second channel 114 can comprise a concave shape.

In one aspect, the second channel 114 can be operable to allow at least a portion 122 of the hook 120 to enter the interior portion 115 of the housing 110.

In one aspect, the second channel 114 can be operable to withstand a torsional force from the hook 120.

In one aspect, the first channel 112 and the second channel 114 can intersect at an angle of from about 15 degrees to about 165 degrees.

In one aspect, the first channel 112 and the second channel 114 can intersect at an angle of about 90 degrees.

In one aspect, the device can further comprise a shuttle 130 coupled to the hook 120.

In one aspect, the shuttle 130 can have a longitudinal guide operable 132 to guide movement of the shuttle 130 into the interior portion 115 of the housing 110.

In one aspect, the longitudinal guide 132 can be a longitudinal track.

In one aspect, the shuttle 130 has a circumferential guide 134 can be operable to guide rotation of the shuttle 130 relative to a vertical plane of the housing 110.

In one aspect, the circumferential guide 134 can be a circumferential track.

In one aspect, the shuttle 130 can be operable to switch between a circumferential guide 134 for rotation to a longitudinal guide 132 for retraction or extension.

In one aspect, the shuttle 130 can be coupled to a shuttle tensioning member 140.

In one aspect, the shuttle tensioning member 140 can be a spring, an elastic fiber, or a combination thereof.

In one aspect, the shuttle tensioning member 140 can be operable to retract the shuttle 130 and at least a portion 122 of the hook 120 into the interior portion 115 of the housing 110.

In one aspect, the shuttle tensioning member 140 can be operable to support a load of from about 15 pounds to about 25 pounds.

In one aspect, the shuttle tensioning member 140 can have a length of from about 4 inches to about 8.4 inches.

In one aspect, the shuttle tensioning member 140 can be an extension spring.

In one aspect, a portion 122 of the hook 120 can be operable to pivot out of the first channel 112.

In one aspect, the hook 120 in a first channel orientation can be operable to engage or disengage a workpiece.

In one aspect, the hook 120 can be operable to rotate between a first channel orientation and a second channel orientation.

In one aspect, the hook 120 can be operable to extend out of the interior portion 115 of the housing 110 in a second channel orientation.

In one aspect, the hook 120 can be operable to position a workpiece into contact with the distal end 110b of the housing 110.

In one aspect, the device 100 can further comprise a hook compression member 150 that can be operable to engage the hook 120.

In one aspect, the hook compression member 150 can be a compression spring, a torsion spring, an extension spring, spring steel, or a combination thereof.

In one aspect, the hook compression member 150 can be operable to engage the hook 120 at a bottom portion 124 of the hook 120.

In one aspect, the hook compression member 150 can be coupled to the hook 120.

In one aspect, the hook compression member 150 can be operable to position a portion 122 of the hook 120 in a non-intersecting portion of the first channel 112.

In one aspect, the portion 122 of the hook 120 can be arcuate.

In one aspect, the hook compression member 150 can be operable to support a load of from about 1 pound to about 5 pounds.

In one aspect, the hook compression member 150 can have a length of from about 0.25 inches to about 0.75 inches.

In one aspect, the device 100 can further comprise protrusions 162a, 162b operable to stop retraction of the hook 120 into the housing 110.

In one aspect, the protrusions 162a, 162b can comprise at least one of pins, screws, bolts, dowels, or a combination thereof.

In one aspect, the housing 110 can be operable to encase at least a portion 122 of the hook 120 and the shuttle 130.

In one aspect, the housing 110 can comprise indicators 180 operable to provide alignment between the housing 110 and a shuttle 130.

In one aspect, the device 100 can further comprise a head 170 operable to couple the distal end 110b of the housing 110 and couple the rod.

In another embodiment, a method for moving a workpiece on a power line can comprise: securing the workpiece to a hook 120 of a device 100 in a non-retractable first channel orientation; rotating the hook 120 to a retractable second channel orientation; retracting at least a portion 122 of the hook 120 into an interior portion 115 of the housing 110 of the device 100; and rotating the device 100 to remove the workpiece from the power line.

In one aspect, the method can comprise retracting the hook 120 into an interior portion 115 of the housing 110 using a longitudinal guide 132 of a shuttle 130 coupled to the hook 120.

In one aspect, the method can comprise rotating the hook 120 from a first-channel orientation to a second-channel orientation using a circumferential guide 134 of a shuttle 130 coupled to the hook 120.

In one aspect, the method can comprise switching between a circumferential guide 134 for rotation to a longitudinal guide 132 for retraction or extension.

In one aspect, the method can comprise pivoting a portion 122 of the hook 120 out of a first channel 112 of the housing 110.

In one aspect, the method can comprise retracting at least a portion 122 of the hook 120 into the interior portion 115 of the housing 110 using a shuttle tensioning member 140.

In one aspect, the method can comprise engaging a workpiece in a first channel 112.

In one aspect, the method can comprise withstanding torsional force from the workpiece to a first channel 112 of the device 100.

In one aspect, the method can comprise rotating the hook 120 when in an interior portion 115 of the housing 110 of the device 100 to engage the workpiece to a power line; pulling the device 100 to extend the at least a portion 122 of the hook 120 out of the interior portion 115 of the housing 110; rotating the hook 120 from the retractable second channel orientation to a non-retractable first channel orientation; and pivoting the at least a portion 122 of the hook 120 into a first channel 112 to unhook the workpiece.

In one aspect, the method can comprise positioning the at least a portion 122 of the hook 120 in a first channel 112 of the housing 110 using a hook compression member 150.

In one aspect, the method can comprise stopping retraction of the hook 120 beyond a threshold interior portion 115 of the housing 110 using protrusions 162a, 162b.

In one aspect, the method can comprise coupling a distal end 110b of the housing 110 to a rod.

In yet another embodiment, a method of transferring a power line clamp from one power line to different power line can comprise: securing a workpiece to a hook 120 of in a first channel orientation; rotating the hook 120 to a second channel orientation; engaging at least a portion 122 of the hook 120 in a second channel 114; and rotating the hook 120 when the at least the portion 122 of the hook 120 is engaged in the second channel 114 to remove the workpiece from the power line.

In one aspect, the method can comprise rotating the at least a portion 122 of the hook 120 when engaged in the second channel 114 to secure the workpiece to a power line; pulling the hook 120 to extend the at least a portion 122 of the hook 120 out of the second channel 114; rotating the hook 120 from the second channel orientation to the first channel orientation; and pivoting the at least a portion 122 of the hook 120 into the first channel 112 to unhook the workpiece from the hook 120.

It is noted that no specific order is required in these methods unless required by the claims set forth herein, though generally in some embodiments, the method operations can be carried out sequentially.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A device comprising:
    a housing having a proximal end and a distal end, said proximal end operable to couple with a rod, and said distal end having first and second intersecting channels, wherein the first channel provides access to an interior portion of the housing;
    a hook retractably and rotatably coupled to the housing such that the hook is operable to rotate in a circumferential direction between a first channel orientation and a second channel orientation; and
    a shuttle coupled to the hook, said shuttle having a longitudinal guide operable to guide movement of the shuttle into the interior portion of the housing, and a circumferential guide operable to guide rotation of the shuttle relative to a vertical plane of the housing such that the hook is operable to rotate with the shuttle between the first channel orientation and the second channel orientation, and wherein said shuttle is operable to switch between the circumferential guide for rotation and the longitudinal guide for retraction or extension, wherein:
    the hook is not retractable into the interior portion of the housing when the hook is aligned with the first channel, and
    the hook is at least partially retractable into the interior portion of the housing when the hook is aligned with the second channel.

2. The device of claim 1, wherein the hook is fully retractable into the interior portion of the housing when the hook is aligned with the second channel.

3. The device of claim 1, wherein:
    the first channel is operable to engage a workpiece; or
    the first channel comprises a slot; or
    the first channel extends to an edge of a periphery of the distal end; or
    the first channel is operable to withstand a torsional force from the workpiece.

4. The device of claim 1, wherein:
    the second channel comprises a concave shape; or
    the second channel is operable to allow at least a portion of the hook to enter the interior portion of the housing; or
    the second channel is operable to withstand a torsional force from the hook.

5. The device of claim 1, wherein:
    the first channel and the second channel intersect at an angle of from about 15 degrees to about 165 degrees; or
    the first channel and the second channel intersect at the angle of about 90 degrees.

6. The device of claim 1, wherein the shuttle is coupled to a shuttle tensioning member.

7. The device of claim 6, wherein the shuttle tensioning member is a spring, an elastic fiber, or a combination thereof, and the shuttle tensioning member is operable to retract the shuttle and at least a portion of the hook into the interior portion of the housing.

8. The device of claim 7, wherein the shuttle tensioning member is operable to support a load of from about 15 pounds to about 25 pounds, or the shuttle tensioning member has a length of from about 4 inches to about 8.4 inches.

9. The device of claim 7, wherein the shuttle tensioning member is an extension spring.

10. The device of claim 1, wherein:
    a portion of the hook is operable to pivot out of the first channel; or
    the hook in a first channel orientation is operable to engage or disengage a workpiece; or
    the hook is operable to extend out of the interior portion of the housing in a second channel orientation; or
    the hook is operable to position a workpiece into contact with the distal end of the housing.

11. The device of claim 1, further comprising a hook compression member operable to engage the hook.

12. The device of claim 11, wherein the hook compression member is a compression spring, a torsion spring, an extension spring, spring steel, or a combination thereof.

13. The device of claim 11, wherein:
    the hook compression member is operable to engage the hook at a bottom portion of the hook; or the hook compression member is coupled to the hook; or the hook compression member is operable to position a portion of the hook in a non-intersecting portion of the first channel, wherein the portion of the hook is arcuate.

14. The device of claim 11, wherein:

the hook compression member is operable to support a load of from about 1 pound to about 5 pounds; or the hook compression member has a length of from about 0.25 inches to about 0.75 inches.

15. The device of claim 1, further comprising protrusions operable to stop retraction of the hook into the housing, wherein the protrusions comprise at least one of pins, screws, bolts, dowels, or a combination thereof.

16. A method for moving a workpiece on a power line, comprising:

securing the workpiece to a hook of a device in a non-retractable first channel orientation;

rotating the hook in a circumferential direction to a retractable second channel orientation using a circumferential guide of a shuttle coupled to the hook;

switching between the circumferential guide of the shuttle to a longitudinal guide of the shuttle;

retracting at least a portion of the hook into an inner portion of the housing of the device using the longitudinal guide of the shuttle; and rotating the device to remove the workpiece from the power line.

17. The method of claim 16, further comprising:

pivoting a portion of the hook out of a first channel of the housing; or retracting at least the portion of the hook into the interior portion of the housing using a shuttle tensioning member; or engaging a workpiece in the first channel; or withstanding torsional force from the workpiece to the first channel of the device.

18. The method of claim 16, further comprising:

rotating the hook when in an interior housing of the device to engage the workpiece to a power line;

pulling the device to extend the at least a portion of the hook out of the interior portion of the housing;

rotating the hook from the retractable second channel orientation to a non-retractable first channel orientation; and pivoting the at least the portion of the hook into a first channel to unhook the workpiece.

19. The method of claim 16, further comprising:

positioning the at least a portion of the hook in a first channel of the housing using a hook compression member; or stopping retraction of the hook beyond a threshold interior portion of the housing using protrusions; or coupling a distal end of the housing to a rod.

20. A method of transferring a power line clamp from one power line to different power line, comprising:

securing a workpiece to a hook of in a first channel orientation;

rotating the hook to a second channel orientation using a circumferential guide of a shuttle coupled to the hook;

switching between the circumferential guide of the shuttle to a longitudinal guide of the shuttle;

engaging at least a portion of the hook in a second channel by retracting at least a portion of the hook using the longitudinal guide of the shuttle; and rotating the hook when the at least the portion of the hook is engaged in the second channel to remove the workpiece from the power line.

21. The method of claim 20, further comprising:

rotating the at least a portion of the hook when engaged in the second channel to secure the workpiece to a power line;

pulling the hook to extend the at least a portion out of the hook out of the second channel;

rotating the hook from the second channel orientation to the first channel orientation; and pivoting the at least a portion of the hook into the first channel to unhook the workpiece from the hook.

\* \* \* \* \*